United States Patent
Yeap et al.

(10) Patent No.: US 8,606,746 B2
(45) Date of Patent: Dec. 10, 2013

(54) PRIVACY MANAGEMENT POLICY HUB

(75) Inventors: Hwee Har Yeap, Belmont, CA (US); Catherine You, Berkeley, CA (US); Qin Lu, Palo Alto, CA (US); Jane Li, Foster City, CA (US); Weiwei Hsieh, Mountain View, CA (US); Lindy H. Chan, Elk Grove, CA (US)

(73) Assignee: Oracle International Corporation, Redwood Shores, CA (US)

( * ) Notice: Subject to any disclaimer, the term of this patent is extended or adjusted under 35 U.S.C. 154(b) by 805 days.

(21) Appl. No.: 12/254,691

(22) Filed: Oct. 20, 2008

(65) Prior Publication Data

US 2009/0254511 A1    Oct. 8, 2009

Related U.S. Application Data

(60) Provisional application No. 60/981,430, filed on Oct. 19, 2007.

(51) Int. Cl.
*G06F 7/00*     (2006.01)
*G06F 17/00*    (2006.01)

(52) U.S. Cl.
USPC .............................. 707/603; 707/694; 707/942

(58) Field of Classification Search
USPC ................... 707/603, 689, 942, 694; 705/317
See application file for complete search history.

(56) References Cited

U.S. PATENT DOCUMENTS

| | | | |
|---|---|---|---|
| 7,853,786 B1 * | 12/2010 | Fultz et al. ...................... | 713/166 |
| 2002/0104015 A1 * | 8/2002 | Barzilai et al. ................. | 713/201 |
| 2004/0117300 A1 * | 6/2004 | Jones et al. ...................... | 705/39 |
| 2004/0267410 A1 * | 12/2004 | Duri et al. ......................... | 701/1 |
| 2005/0065824 A1 * | 3/2005 | Kohan .............................. | 705/3 |
| 2006/0026042 A1 * | 2/2006 | Awaraji et al. .................... | 705/3 |
| 2007/0118887 A1 * | 5/2007 | Roskind ............................ | 726/5 |
| 2008/0028435 A1 * | 1/2008 | Strickland et al. ................ | 726/1 |
| 2008/0147511 A1 * | 6/2008 | Edwards .......................... | 705/18 |

* cited by examiner

*Primary Examiner* — James E Richardson
(74) *Attorney, Agent, or Firm* — Campbell Stephenson LLP

(57) ABSTRACT

A system architecture is disclosed that includes a privacy management system. In particular, the privacy management system provides a policy hub for maintaining and managing customer privacy information. The privacy management system maintains a master data database for customer information and customer privacy preferences, and a rules database for privacy rules. The privacy management system captures, synchronizes, and stores customer privacy data. Privacy rules may be authored using a privacy management vocabulary, and can be customized for an enterprise's privacy policies.

26 Claims, 11 Drawing Sheets

PRIVACY MANAGEMENT POLICY HUB

This application claims the benefit, under 35 U.S.C. §119 (e), of U.S. Provisional Application No. 60/981,430, filed Oct. 19, 2007, entitled "Privacy Management Policy Hub,"and naming Joanne Yeap, Catherin You, Qin Lu, Jane Li, Weiwei Hsieh, and Lindy Chan as inventors. The above-referenced application is hereby incorporated by reference herein in its entirety.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

FIELD OF THE INVENTION

This invention relates to the field of data privacy, and more particularly relates to privacy policy management.

BACKGROUND OF THE INVENTION

Businesses' ever-increasing reliance on information and the computing systems that produce, process, distribute, and maintain such information in its various forms, puts great demands on techniques for thoroughly and efficiently securing that information. Because business organizations can produce and retain large amounts and varieties of information (and normally do so, in fact), the need for securing such information will only increase. These issues are especially important with regard to information kept by businesses regarding their customers.

As consumer awareness of the importance of and need for data privacy increases with the inevitable increases in data-sharing that such reliance engenders, the importance of customer data privacy management has increased, particularly in view of the flurry of federal, state and international laws that is pushing such issues to the top of many businesses agendas. In the financial services industry, for example, companies are making tremendous efforts to comply with privacy laws and to protect their customers' privacy rights. The implementation of privacy best practices within the complex process and information technology (IT) environment of financial institutions often requires team collaboration among the legal, office of privacy, operations, businesses, and technology owners. The course to owning a homegrown privacy solution is costly and such a solution is frequently not scalable when business and IT complexity increases. Many companies opt to shut down cross-marketing activities because such companies have not gone through or updated the compliance processes required to share customer data or solicit product interests. The inability to capitalize on their existing customer relationship management (CRM) and marketing campaign investments, in order to derive customer insight, is a profound problem for businesses lacking an adequate solution to manage privacy compliance. However, good privacy practice is not only important to meeting the letter of the law, but has a number of benefits for businesses willing to implement sound policies and procedures. Various polls shows consumers tend to buy more frequently and in higher volumes from companies they believe to have sound privacy practices. Companies can view customers' privacy needs as an opportunity to articulate both company's established privacy practice and the value from permission-based sharing to the consumer.

Entities wishing to address these needs must contend with a diverse array of privacy regulations. The following are examples of privacy regulations and policy components that drive the need for a privacy management solution. One such set of privacy regulations is the Fair Credit Reporting Act (FCRA), which was the first federal privacy law. The FCRA was set forth in Consumer Credit Reporting Reform Act of 1996 and is still in effect today. In December 2003, the Fair and Accurate Transaction Act (FACTA) amended the FCRA to include certain additional privacy provisions (effective dates vary). The FCRA applies to the disclosure of "consumer reports," which contains information regarding a consumer's credit worthiness/standing/capacity, such as credit scores, income, assets, and the like. The FCRA prohibits non-consumer reporting agencies from sharing this type of personal information with non-affiliated third parties. The FCRA makes a distinction between traditional consumer report information and transaction/experience information that may bear on a consumer's credit worthiness/standing/capacity (i.e. slow to pay). The FCRA prohibits the sharing of traditional consumer report information with affiliates unless the consumer is first given a notice and opportunity to opt-out of such sharing and the consumer does not opt out, though an entity may share transaction/experience information freely with affiliates. Under FACTA, there is a prohibition on an affiliate's use of traditional consumer report and transaction/experience information ("eligibility information") unless the consumer is first given a notice and opportunity to opt of such use and the consumer does not opt. For willful violations, the law carries up to $1,000-$2,500 fine per violation but not less than $100 per violation and, in some cases, attorney's fees; for negligent noncompliance, the law provides actual damages, court costs, and attorney's fees.

Another set of privacy regulations is the Gramm-Leach-Bliley Act (GLBA). The GLBA is a privacy law that was effective November 1999 and provides for mandatory compliance with the FTC Privacy Regulations as of Jul. 1, 2001. The GLBA applies to "financial institutions," which are defined as companies that offer products or services to individuals, such as loans and leases, financial or investment advice, or insurance. The GLBA governs the use and disclosure of nonpublic personal information (NPI; personally identifiable financial information). The GLBA makes a distinction between "consumers" and "customers", as defined. The GLBA requires financial institutions to provide a Privacy Policy Notice describing certain aspects of their privacy policies and information-sharing practices to all new customers at the inception of the relationship and annually thereafter until the relationship is terminated. If the company's sharing practices change, a company's Privacy Policy Notice must also change and the revised notice and a reasonable opportunity to opt out, if applicable, must be provided to the customer. The GLBA requires financial institutions to provide a Privacy Policy Notice describing certain aspects of their privacy policies and information-sharing practices to all consumers before the institution discloses any NPI about the consumer to any nonaffiliated third party outside the exceptions of the law. The GLBA allows both consumers and customers have Opt Out Rights to limit some—but not all—sharing of their personally identifiable financial information (PIFI) with non-affiliated third parties. The law carries a fine not to exceed $11,000 per violation and injunctive relief.

The GLBA "Safeguard Law" became effective November 1999, and compliance with the FTC Safeguards Regulations became mandatory as of May 23, 2003. This law also applies to "financial institutions"—companies that offer products or services to individuals, like loans and leases, financial or investment advice, or insurance. The law governs the handling of customer NPI. The law requires financial institutions to develop and implement a comprehensive written information security program that contains administrative, technical, and physical safeguards to protect NPI. Again, the law carries a fine not to exceed $11,000 per violation and injunctive relief.

Such laws also exist at the state level. An example of such a law is the California Financial Information Privacy Act (CFIPA; also known as CA SB1), which became effective Jul. 1, 2004. Prior to sharing any nonpublic personal information with an affiliate, CFIPA requires that financial institutions provide California-based residents with a special disclosure and allow a 45-day initial waiting period before sharing occurs in order to provide a customer with an opportunity to exercise his/her opt out right. Certain exceptions apply. A financial institution must implement the consumer's opt out within 45 days of receipt. There is a safe harbor disclosure form. Before sharing nonpublic personal information with a nonaffiliated third party, CFIPA requires financial institutions to obtain a consumer's affirmative written consent (opt-in) on a special disclosure form to engage in the sharing. Certain exceptions also apply here. The law carries a fine not to exceed $2,500 per violation with a $500,000 cap. However if a financial institution knowingly and willfully violates CFIPA there is no cap. If a violation results in identity theft, civil penalties will be doubled.

Such regulations also take the form of simple prohibitions. For example, the National Do Not Call Registry (NDNCR) became effective October 2003. The NDNCR applies to all telemarketers, does not include political organizations, charities, telephone surveyors, or companies with which consumers have an existing business relationship, while a similar restrictions (the Federal Trade Commission (FTC) Telemarketing Sales Rule (TSR)) extends to interstate telemarketing activity. The Federal Communications Commission (FCC) Telephone Consumer Protection Act (TCPA) also regulates telemarketing and its jurisdiction regulates both interstate and intrastate telemarketing activity. The TCPA may preempt certain state telemarketing laws. In fact, the FTC and the FCC both utilize the National Registry. With regard to such regulations at the state level, it will be noted that fifteen states have shared data with the national registry before Jun. 26, 2003 and some states have their own state do not call registry. Further, some states statutorily designate the national registry as their own state registry. Telemarketers and sellers were initially required by the FTC to search the registry at least every three months, and beginning Jan. 31, 2005, once every 31 days. These telemarketers and sellers must drop the phone numbers registered from their call lists. Customers on the registry can file a complaint online or by calling and violators of the FTC TSR could be fined up to $11,000 per incident, plus state penalty where applicable. There is a "safe harbor" for inadvertent violations, however.

Another set of privacy-centric regulations is the USA Patriot Act, and Section 326 thereof, in particular. The Patriot Act requires the Secretary of Treasury to prescribe regulations for financial institutions to implement procedure to 1) verify the identity of any person opening an account; 2) maintain records of the information used to verify a person's identity, including name, address, and other identifying information; and 3) consulting lists of known or suspected terrorists organizations provided to the financial institution by any government agency to determine whether a person seeking to open an account appears on any such list.

Office of Foreign Asset Control (OFAC) Economic Sanction Rules (ESRs) also address privacy issues. OFAC administers and enforces economic sanctions programs primarily against countries and groups of individuals, such as terrorists and narcotics traffickers. OFAC ESRs prohibit "US persons" from doing business with Specially Designated Nationals (SDNs). Entities must check the SDN List prior to engaging in business with an individual. If the individual is on the list, the entity must determine if it is a true hit. If so, certain blocking, rejecting and reporting requirements apply. Awareness of OFAC Sanction Rules has increased since the enactment of the USA Patriot Act, but the sanctions regime has been in place since WWII.

Other laws also exist that implicate privacy issues, and place requirements on business entities that such entities must take into consideration in operating their businesses. For example, under California law, businesses are no longer able to post or publicly display Social Security numbers, print the numbers on identification cards or badges, require people to transmit the numbers over the Internet unless the connection is secure or encrypted, require people to log onto a World Wide Web site using a Social Security number without a password or print the numbers on materials mailed to customers unless required by law or the document is a form or application. Effective Jul. 1, 2006, Illinois enacted a similar law. Another example are Security Breach Laws. Under California law, those who do business in California and that own or license computerized data that includes personal information, as defined, must disclose any breach of the security of the system following discovery or notification of the breach in the security to any resident of California whose unencrypted personal information was, or is reasonably believed to have been, acquired by an unauthorized person. Several other states are following suit.

As will be appreciated, following such a wide variety of disparate laws can present a multitude of issues and obstacles for a business. In response to these demands, many businesses have attempted to develop proprietary privacy solutions to accelerate their compliance with privacy regulations, particularly when enforcement tightens to protect consumer privacy data in the past. However, as can easily be appreciated, these homegrown privacy efforts have historically failed to address the mandates of the aforementioned rules and regulations, as well as others. As a result of such failures, businesses face increased exposure to the inadvertent violation of such rules and regulations, and the penalties that accompany such infractions. Moreover, because the systems are not only inadequate, but costly to update, businesses face ever-increasing costs in an attempt to maintain such systems. Further still, the privacy compliance process is long and resource-consuming for both the business and its IT group. The following provides a short list of examples of the issues such proprietary systems encounter, which include:

1) Lack of a central system with flexible customer information management infrastructure to store and publish unique, correct and complete customer's personal data, opt-in/out sharing consents, solicitation preferences and the like. Manual steps are often required to generate multiple lists, which must then be integrated, in order to obtain customers' privacy statuses.

2) Costly IT projects are required to roll out new privacy policies and processes across an entity's systems. These projects involve significant resource investments and typically involve some variation of the following steps:
   a. General Counsel interprets privacy laws and creates consumer privacy policies. Note that companies evaluate the privacy laws with varying interpretation approaches—conservative, moderate and liberal interpretation and with different business models.
   b. A core team including legal, office of privacy, business operations, corporate marketing, IT and/or business personnel is formed to assess the impact of the new privacy policies and sets forth the plan to roll out the requirements.

c. Privacy officers and/or business analysts create business requirements based on the new privacy policies.

d. IT designers create design specifications to comply with business requirements.

e. IT programmers write and test the code per the design specifications.

3) Inability to react/react with sufficient swiftness to changes in privacy policy, particularly in implementing such changes quickly and consistently across the company. This is at least due to the need to roll out such changes across a substantial number of the business' systems.

4) The inordinate effort required to effect changes to proprietary privacy database(s) and application(s).

Therefore, it is desirable to provide a mechanism and system that efficiently maintains privacy information, and addresses the foregoing issues.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

Figure 1:
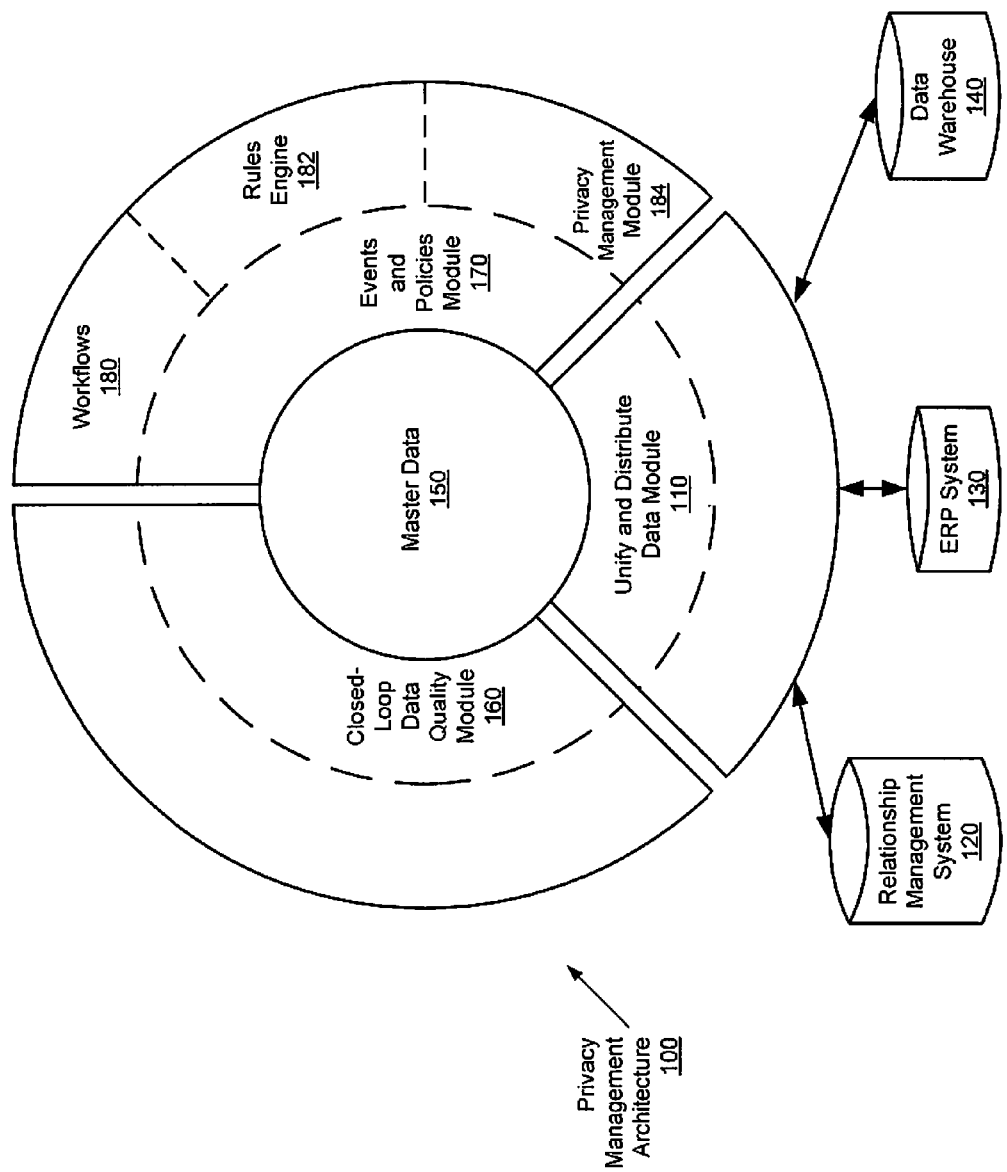
FIG. 1 is a diagram of the basic structure and functionalities of an architecture according to embodiments of the present invention.

The following is intended to provide a detailed description of an example of the invention and should not be taken to be limiting of the invention itself. Rather, any number of variations may fall within the scope of the invention which is defined in the claims following the description.

Introduction

The present invention provides a mechanism for a privacy management policy hub for maintaining privacy information in an effective and efficient manner. A privacy management system according to the present invention through technology and processes that enable an enterprise to implement best practices in the privacy arena. The solution is built with the rationale that a successful privacy management implementation requires three major components: a customer master, where all the privacy preferences are maintained; an integration technology, which synchronizes privacy data across the enterprise and an external rules engine, which allows rapid rules creation and processing.

Best practices in the privacy arena implicate five "fair information practice principles." Implementations of the present invention's privacy management policy hub provide both the technology and process to enable entities (e.g., companies and other businesses) to implement such principles. The five principles of privacy protection are: (1) Notice/Awareness, (2) Choice/Consent, (3) Access/Participation, (4) Integrity/Security, and (5) Enforcement/Redress.

The first principle, Notice/Awareness, addresses providing customer information on the uses and purposes for the collection of the personally identifiable information (PII). Examples of such documents are the annual privacy notice letter sent to a customer outlining a company's privacy practices and the online privacy statements posted on a company's website.

The second principle, Consent/Choice, addresses providing customers the opportunity to opt-in/-out regarding use of their PII, how their personal information will be used, and respect for customers' elected solicitation choices. Examples are providing a toll-free number for customers to opt-out sharing with various parties and filtering out marketing campaign lists of the phone numbers registered on the National Do Not Call (DNC) list.

The third principle, Access/Participation, addresses providing mechanisms for customers to access, review and contest their own data's accuracy and completeness, which can be distributed to granted recipients. Examples are CallCenter hotlines, branch tellers, and online channels that allow changes of customer information. Once data is updated, the updated data should be reflected in all business units within the company.

The fourth principle, Integrity/Security, addresses ensuring customer data is accurate and secure. An entity should obtain data from reputable sources, cross-referencing data against multiple authenticated sources, and transmitting data via secured network. Both managerial and technical measures should be in place to monitor access to data and prevent unauthorized access. Examples are audit trail and reporting tools to allow privacy managers to monitor and track data access and revisions.

The fifth principle, Enforcement/Redress, addresses providing a mechanism for customers to report potential privacy violations and to file a complaint with the organization. An example is providing a 'privacy enforcement' contact online or a privacy violation reporting hotline. The foregoing principles are embodied in the architectures, systems and the like now described.

FIG. 1 is a diagram of the basic structure and functionalities of an architecture according to embodiments of the present invention. FIG. 1 depicts a privacy management architecture 100 that achieves the objectives necessary to the integration and protection of customer data. A privacy management architecture such as privacy management architecture 100 shifts attention from a product-centric to a customer-centric view. Such an architecture also allows for a better understanding of the customer's relationships and hierarchies. This, in turn, allows improved customer experience data quality by increasing the accuracy and completeness of customer information, as well as ensuring consistency and accuracy of such information across operational systems of the entity. By centralizing customer information management and automating numerous administrative tasks, the management of data is simplified. An important facet of such data management is compliance with current and future privacy regulations.

Thus, privacy architecture 100 supports the unification and distribution of data (depicted in FIG. 1 as a unify and distribute data module 110). Systems interact with this facet of privacy management architecture 100 include relationship management modules (depicted in FIG. 1 as a relationship management system 120), and enterprise resource planning system (ERP; depicted in FIG. 1 as an ERP 130), and a data warehouse (depicted in FIG. 1 as a data warehouse 140), among other such systems. Data from systems such as relationship management system 120, ERP system 130, and data warehouse 140 is unified and distributed by unify and distribute data 110, and is made available thereby as master data 150. Master data 150 is "cleansed" by a closed-loop data quality module 160. Master data 150 can thus be treated as "trusted"—a unique, complete and accurate representation of the customer's information, available across the enterprise. Master data 150 is made available via an events and policies module 170.

Events and policies module 170 allows access to master data 150, and supports the functionalities that allow the enterprise and its personnel to gain insights regarding its customers, to improve data quality and to comply with privacy and regulatory requirements, among other such functions. Events and policies module 170 thus supports workflows 180 and a rules engine 182. Events and policies module 170 and rules engine 182, in turn, support a privacy management module 184 (which supports such compliance).

Embodiments of the present invention allow an entity to provide customer insights by connecting customer relationship management (CRM), enterprise resource planning (ERP) and/or financial systems to an authoritative customer data source, where the customer data is unique, complete, correct, and reflective of customer's sharing consents and solicitation choices. Moreover, embodiments of the present invention provide tools and processes to allow a privacy officer to administer company privacy rules directly in the system and prepare for ad hoc regulatory audits. Embodiments of the present invention provide the following capabilities and features, among other such advantages.

Among the capabilities and features can be provided by a system according to the present invention is a privacy data model. Embodiments of the present invention can provide enhanced data models to provide standard privacy data definitions that capture customer data sharing consent, such as opt-in/out, solicitation choices, do not email/call, election to receive privacy notices, and other necessary data to generate compliance reports and revision history. Another feature that can be provided by a system according to the present invention is privacy views. Embodiments of the present invention can provide at-a-glance privacy data status and history views. The history views allow for compliance monitoring of when/what/who updates privacy preferences. Yet another feature that can be provided by a system according to the present invention is one or more connectors to third party systems. Embodiments of the present invention can be configured to allow entities with a third party business rules application to provide a user-friendly interface for privacy experts and/or business users to author privacy rules rapidly. Still another feature that can be provided by a system according to the present invention is privacy management vocabulary. Embodiments of the present invention can be configured to provide pre-configured privacy rule building blocks, (referred to herein as privacy vocabularies), as well as one or more sets of sample privacy rules. Such a privacy vocabulary has modeled privacy entities and attributes, and can be built in the context of the then-current privacy regulations. These sample rules can be leveraged to create custom rules specific to an entity's privacy policies.

A system according to the present invention can also be configured to provide contact and account management through business integration application (BIA) functionality. Such business integration administration functionality can be used to create business integration processes (BIPs), as well as to provide pre-built BIPs, to synchronize privacy data associated with contacts, accounts, financial accounts, and households between applications. Such a system can also provide privacy integration web services, to allow interaction between a system of the present invention and other systems, and between such systems. As a system of record, a system according to the present invention provides web services to interact with systems across an enterprise. These web services include privacy integration objects capable of querying/updating/inserting customers' privacy data. A system according to the present invention can also be configured to provide privacy reporting using a privacy reporting tool. A system according to the present invention enables a user to easily configure and generate point-in-time privacy reports based on the comprehensive privacy entities and relationships in master data database.

A system according to embodiments of the present invention provides a number of features and advantages, including, but not limited to those listed in Table 1, below.

TABLE 1

Features of a privacy management system according to embodiments of the present invention.

| Feature | Description |
| --- | --- |
| Survivorship | The Survivorship feature provides a rules-based means to automate the quality of the master data database data. Data is compared to its source and age to determine whether to maintain or update customer data. Survivorship rules are an automated means of controlling the quality of customer data. Multiple systems connect to the system with record update and insert requests, and, to make sure that the system presents the most trusted information contributed by each of these systems, administrators can create and use survivorship rules to govern which |

TABLE 1-continued

Features of a privacy management system according to embodiments of the present invention.

| Feature | Description |
| --- | --- |
| | updates from which external systems can be trusted at the field level based on key criteria. Survivorship rules use attribute groups, which determine the set of fields to be evaluated by the survivorship rule, and use comparison criteria, such as confidence level of the publishing system or the most recent published data, to evaluate whether inputs from given external systems can be used to update the system. There is an implicit default attribute group, which includes the fields that are not explicitly defined in an attribute group definition. There is also a default criteria for each survivorship rule, that is, if there is no explicit rule definition for a certain attribute group (including the default attribute group), then the default criteria applies to determine whether an external system can update the system. |
| Cross-referencing | The system's cross-referencing allows the identification of customer data in external systems to be saved in the system allowing a one-to-many mapping of this data |
| Best Version Records | Best Version records describe the current best state of the customer data stored in the system. These records may be updated in the future based on survivorship rules or other data management processes. Historical best versions of customer data are also stored in the system's Source Data History table. |
| Source Data History (SDH) Table | The Source Data History (SDH) tables maintain a record of data transactions between the system and registered external systems. The Source Data History tables (SDH tables) contain the transactional contact and account data records pertaining to the system and registered external systems. These tables hold incoming, best version, and historical data records, and provide the content for the system administration views. The storage of this data allows for system features such as survivorship, merge and unmerge, and so on. |
| Publish and Subscribe | Publish and subscribe functionality determines the details on how external systems receive customer data updates from the system. |
| Data Cleansing and Matching | The system supports data cleansing using a Data Quality module and data matching. The system also supports alternative cleansing and matching technologies. |
| Connector for Data Applications | Siebel Connector for Master Data applications describes a set of preconfigured business services used to administer system processes. Connector for Data Applications describes a set of configurable components for integration among enterprise applications and Data Applications. |
| XML Messages | XML messages are an XML messaging format used for data exchange. |

Figure 2:
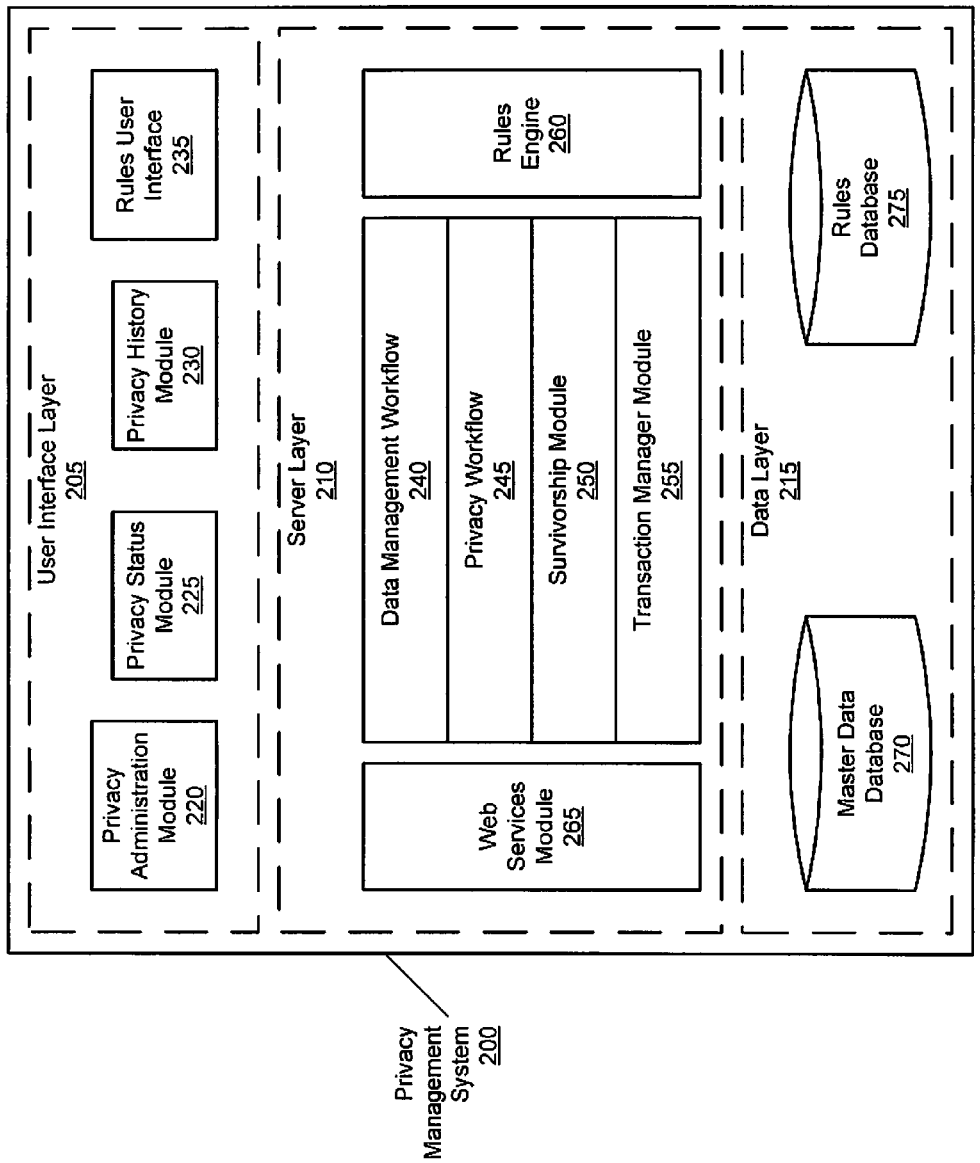
FIG. 2 is a block diagram illustrating an implementation of a privacy management architecture according to embodiments of the present invention.

An Example of a Privacy Management System According to Embodiments of the Present Invention FIG. 2 is a block diagram illustrating an implementation of a privacy management architecture according to embodiments of the present invention. Such a privacy management system is capable of providing the aforementioned features and advantages, among others. FIG. 2 depicts a privacy management system 200, which, in turn, includes a user interface layer 205, a server layer 210 and a data layer 215. User interface layer 205 supports access to privacy management system 200 through the use of a number of modules, which include a privacy administration module 220, a privacy status module 225, a privacy history module 230 and a rules user interface 235. Privacy administration module 220 supports administrative and logistical tasks performed by a system administrator, supporting tasks such as system administration, data management, data capture and other such activities. Privacy status module 225 supports the tracking of current and past privacy sharing statuses for various entities, and provides other such functionality. Privacy history module 230 supports the tracking of past privacy sharing statuses for various entities. Rules user interface 235 supports the entry and update of privacy rules based on local, state, national and foreign privacy laws. Rules user interface 235 also supports such functions with regard to customer-specific privacy policies.

Server layer 210 supports user interface layer 205 by providing a number of functions. Server layer 210 includes a number of workflows (e.g., workflows 180), which appear in FIG. 2 as a data management workflow 240 and a privacy workflow 245. Supporting these workflows are a survivorship module 250 and a transaction manager module 255. Data management workflow 240 and privacy workflow 245, among other such workflows, allow an entity to respond to customer life cycle events and update privacy preferences. Supporting these functions, and the maintenance of information regarding the privacy rules and regulations being implemented, is a rules engine 260. The aforementioned workflows and modules can use rules engine 260 to make determinations as to how to best meet the privacy rules and regulations in force at the time, as well as customer preferences in this regard. The functionalities provided by the aforementioned workflows and modules can also be made available to other entities or organizations within an entity via a web services module 265.

Supporting the functionalities provided by server layer 210, data layer 215 includes one or more databases, which maintain the requisite information. As depicted in FIG. 2, data layer 215 includes a master database 270, which includes not only customer information, but also customer privacy sharing status. Such customer privacy sharing status and related information can be published to an entity's other information systems such as relationship management systems, marketing information systems and the like. A rules database 275 also exists in data layer 215. Rules database 275 captures the privacy rules and regulations that are currently in force and implemented by the entity.

A privacy management system according to the present invention offers Universal Unique Identification (UUID) generation, survivorship, data management, source data capture and record merge features. A system according to the present invention comes with an admin user interface for working customer information through a data management process, de-duplication of account and contact records, account hierarchy management and data anomaly handling.

The foregoing described embodiment wherein the different components are contained within different other components (e.g., the various elements/components of a computer system). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", "communicatively coupled" or "operably coupled", to each other to achieve the desired functionality.

Figure 3:
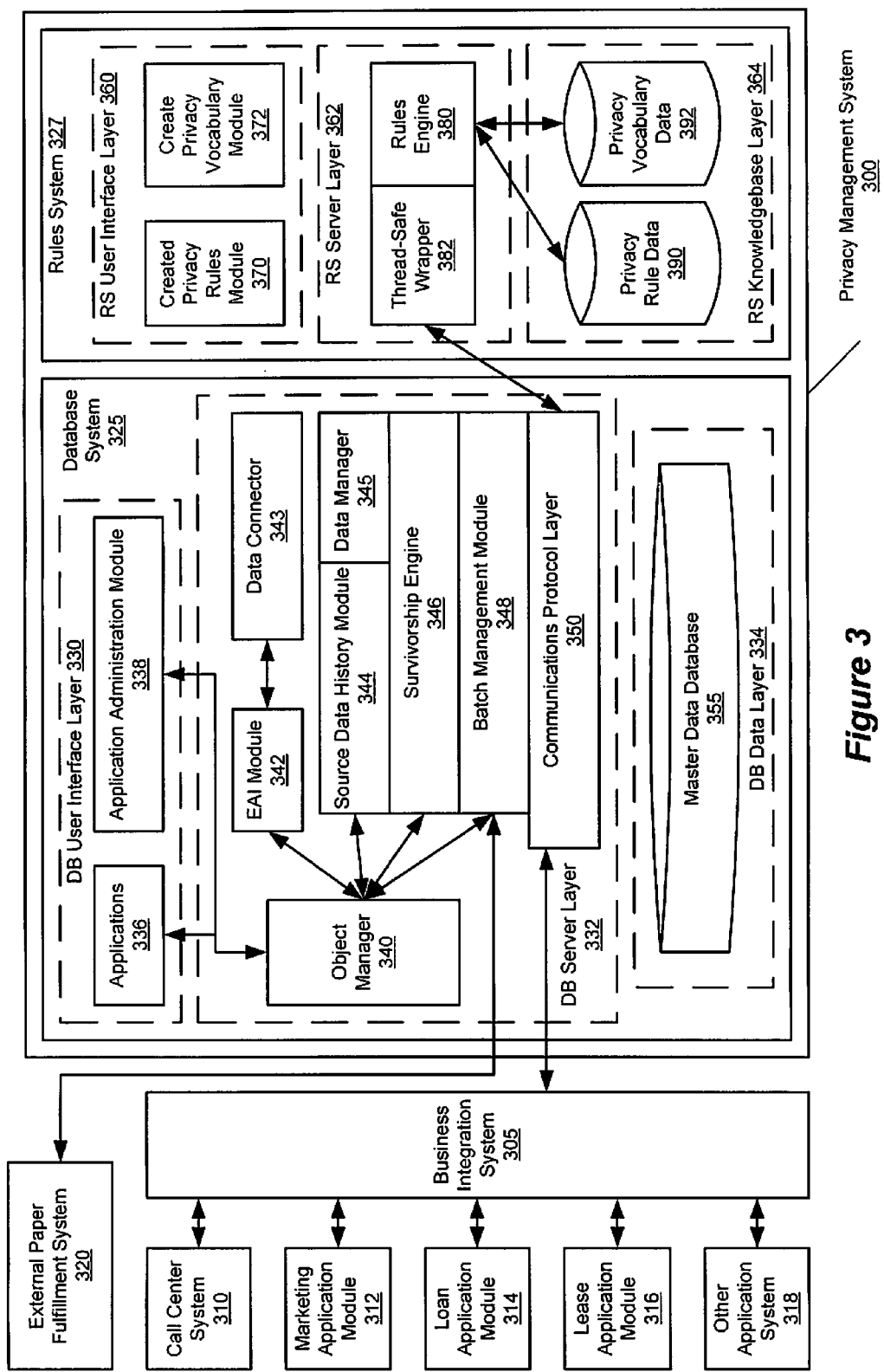
FIG. 3 is a block diagram illustrating a privacy management architecture according to embodiments of the present invention, in greater detail.

FIG. 3 is a block diagram illustrating a privacy management architecture according to embodiments of the present invention, in greater detail. The privacy management architecture of FIG. 3 includes a privacy management system 300 that is communicatively coupled to a business integration system 305. Business integration system 305 couples privacy management system 300 to a number of other systems, including a call center system 310, a marketing application module 312, a loan application module 314, a lease application module 316 and other application systems 318. In light of the potential for paper-based legacy systems, privacy management system 300 also allows for communication with an external paper fulfillment system 320.

Privacy management system 300 provides the requisite functionality for maintaining customer information in a safe and secure environment, which meets the mandates of the privacy rules and regulations to which the entity is subject. To provide such functionalities, privacy management system 300 includes a database system 325 and rules system 327, which are communicatively coupled to one another. Database System 325, in turn, includes a database user interface layer 330, a database server layer 332 and a database data layer 334. Database user interface layer 330 includes one or more applications 336 and at least one application administration module 338. Applications 336 and application administration module 338 communicate with the various modules of database server layer 332 via an object manager 340, which exists in database server layer 332. Object manager 340, in turn, supports communications with modules in database user interface layer 330 with various modules of database server layer 332, including an enterprise application integration (EAI) module 342, which in turn communicates with a data connector 343. Object manager 340 also communicates with a source data history (SDH) module 344, which in turn communicates with a data manager 345. Object manager 340 also provides communications to a survivorship engine 346 and a batch management module 348. Also in communication with batch management module 348 is external paper fulfillment system 320.

The various modules of database server layer 332 communicate with various other modules outside of database server layer 332 via a communications protocol layer 350. Communications protocol layer 350 communicates with business integration system 305 to allow outside module in systems such as those depicted in FIG. 3 to communicate with privacy management system 300. Communications protocol layer 350 supports a number of transport protocols including the java message service (JMS) transport, the message queue (MQ) transport and hyper-text transport protocol (HTTP) transport. Communications protocol layer 350 is also referred to herein as an integration transport.

A system according to the present invention leverages an EAI architecture (as represented by EAI module 342), and supports several integration protocols—among them JMS, MQ and HTTP—to exchange data within the system, and between the system and external systems. Custom integrations can be built using these support protocols or other business integration processes, which can be built to include integration transforms.

The Java Message Service (JMS) transport is a transport that can be used to send and receive messages via JMS messaging. A privacy management system according to the present invention provides JMS Transport that supports both the point-to-point (queue) messaging and the publish-and-subscribe (topic) messaging. The JMS messages can be executed in both synchronous and asynchronous modes. In synchronous mode, the sender application waits for the method to return. In asynchronous mode, the sender listens for messages arriving on a particular queue/topic and whenever one arrives, the JMS listener picks up the message and dispatches to a business service. The following JMS transport operations can be supported: Receive, ReceiveDispatch, ReceiveDispatchSend, Send, SendReceive, Publish and Subscribe.

Message Queue (MQ) Transport—Transport to send and receive message via MQ Series server. For inbound messages into a privacy management system according to the present invention, the messages are received and routed by the MQ Receiver. For outbound messages to external systems, users can specify in Workflow Process Manager where the queue should be sent.

The Hyper-Text Transport Protocol (HTTP) transport is a transport that can be used to send and receive XML messages over HTTP to/from a target URL. Web engine serves as the transport to receive XML messages sent over the HTTP protocol to a privacy management system according to the present invention. A user can use the Send or SendReceive method for transport.

It will be appreciated that web services, as described herein, allow a privacy management system according to the present invention to provide web services to interact with systems, in order to access customer data, including privacy information, across the enterprise.

Maintaining the requisite information is a master data database 355 in database data layer 334. The modules of database server layer 332 access the data within master data database 355, for example, via communications protocol layer 350.

Communications can also occur between database system 325 and rule system 327 via communications protocol layer 350. Rule system 327 provides database system 325 with privacy management functionality, and includes a rules system user interface layer 360, a rules system server layer 362, and a rules system knowledgebase layer 364. Rule system user interface layer 360 includes a create privacy rule module 370 and a create privacy vocabulary module 372. The modules of rules system user interface layer 360 communicate with the modules of rules system server layer 362, which include a rules engine 380. Rules engine 380 can also be accessed by the modules of database system 325 (and more specifically by the modules of database server layer 332) via communications protocol layer 350 and a thread-safe wrapper 382, which protects rules engine 380. Thread-safe wrapper 382 presents a level of protection against inappropriate changes to rules engine 380, and so protects rules engine 380. Rules engine 380, in turn, maintains privacy rule data 390 and privacy vocabulary data 392 in rules system knowledgebase layer 362.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 4:
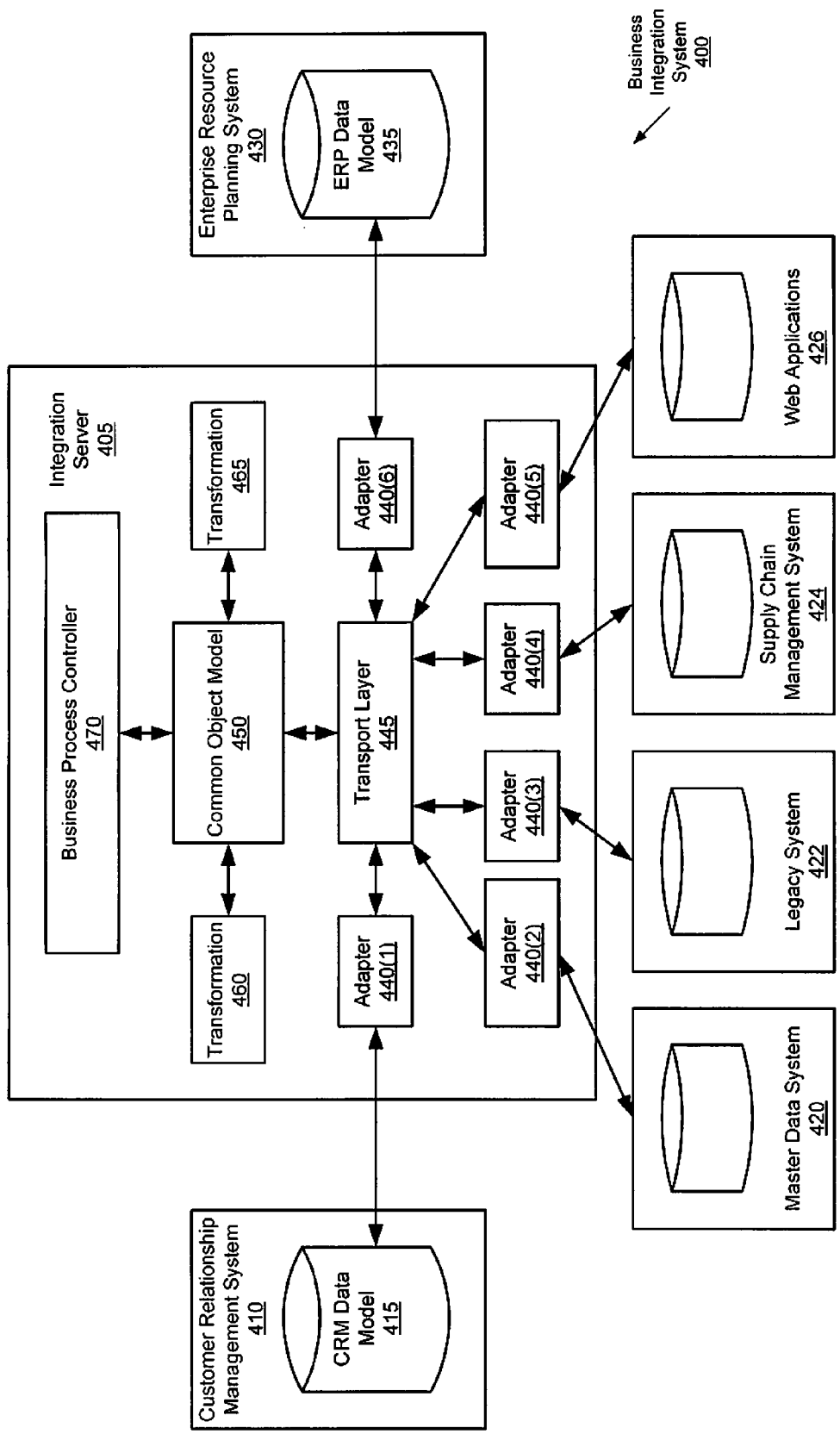
FIG. 4 is a block diagram illustrating an example of business integration system according to embodiments of the present invention.

An Example of a Business Integration System According to Embodiments of the Present Invention FIG. 4 is a block diagram illustrating an example of business integration system 305, in greater detail. FIG. 4 thus depicts a business integration system 400 that includes an integration server 405 with connection to a customer relationship management (CRM) system 410 (which, in turn, includes a CRM data model 415), a master data system 420, a legacy system 422, a supply chain management (SCM) system 424, web applications 426, and an enterprise resource planning (ERP) system 430 (which, in turn, includes an ERP data model 435).

Integration server 405 provides the infrastructure necessary for a system such as privacy management system 300 to communicate with the various systems and sources of data. To this end, integration server 405 includes a number of data adaptors (depicted in FIG. 4 as adaptors 440 (1)-(6)), which provide communication between the various systems and applications depicted in FIG. 4 (among other such systems) and a transport layer 445 of integration server 405. Transport layer 445 provides communication between adaptors 440 (1)-(6) and a common object model 450. Common object model 450 is communicatively coupled to a number of transformations (depicted in FIG. 4 as transformations 460 and 465). Common object model 450 is also able to access a business process controller 470 (and vice versa).

A business integration system such as that just described can be configured with pre-packaged business integration processes (BIPs) that support the synchronization of privacy data associated with account, contact, financial assets, and household objects other systems. Following is a BIA that packages SIA transforms in Sync Contact and Sync Account BIP, as well as BIP—Sync Financial Account.

Table 2 provides an example of a business integration process for customer lifecycle management.

TABLE 2

Features of a BIP according to embodiments of the present invention.

| Business Integration Process | |
| --- | --- |
| Sync/Request Contact | Source |
| | SYSTEM |
| | Target |
| Sync/Request Account | Source |
| | SYSTEM |
| | Target |
| Sync/Request Financial Account | Source |
| | SYSTEM |
| | Target |
| Sync/Request Household | Source |
| | SYSTEM |
| | Target |

Third Party

A privacy management system according to the present invention integrates with third party rules engine vendors to provide an interface to business users to authorize, model and deploy rules. It allows users to author privacy rules in plain English sentences. The application has capabilities of versioning and access control allowing privacy officers and business users to control rules access and monitor when a rule is updated and by whom. Once a rule is created, the application generates programming code automatically processed.

An Example of a Data Model Requirements According to Embodiments of the Present Invention A system according to the present invention leverages the data model; which has the most comprehensive customer data model on the market. Such a system leverages data objects such as Party, Party Contact, Account, Contact, Financial Asset, Household, Party Relationship To, Contact Relationship, Business Address, Personal Address, Channel Partner and Partner Contact.

In a privacy management system according to the present invention, several tables are provided to enhance features such as merging, data management and integration.
Cross-reference table for Contacts (CIF_CON_MAP)
Cross-reference table for Accounts (CIF_ORG_MAP)
Cross-reference table for Household (CIF_ORGRP_MAP)
Table for system registration (CIF_EXT_SYST)
Table for application authorization (CIF_SYS_DTL)

A privacy management system according to the present invention provides privacy entities for several other tables, as well.

Figure 5:
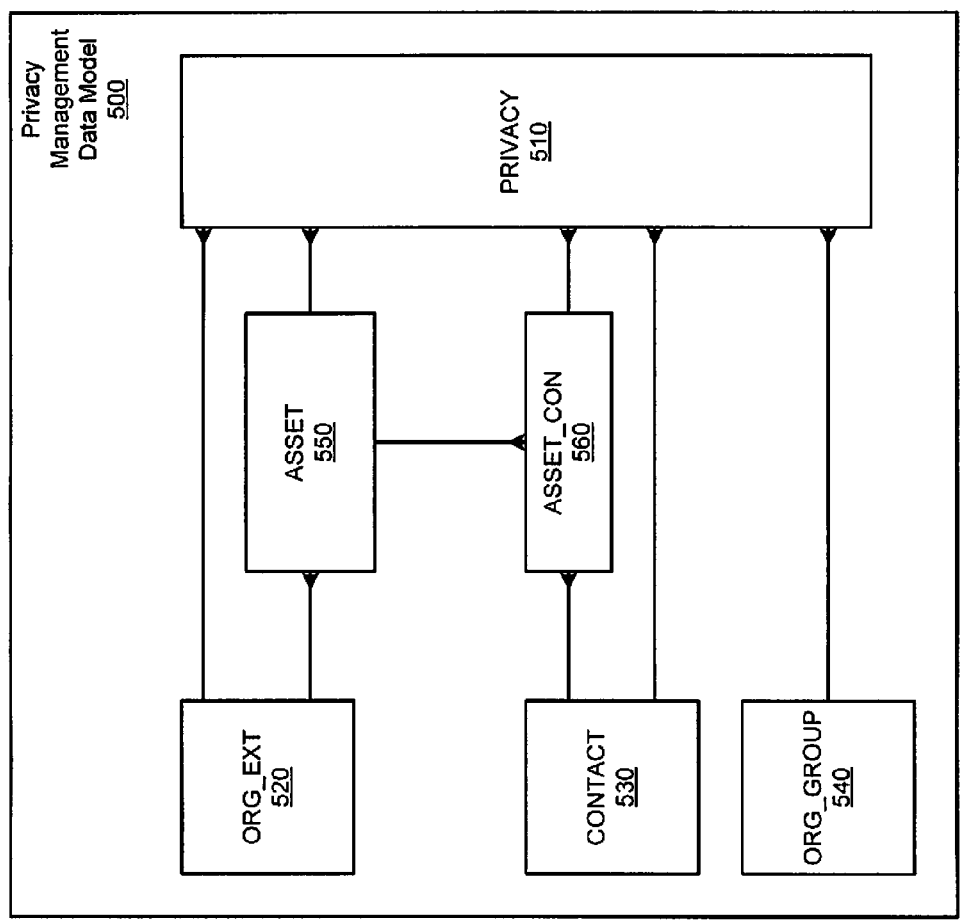
FIG. 5 is a block diagram that illustrates a general data model that supports the privacy concepts according to embodiments of the present invention.
Figure 6:
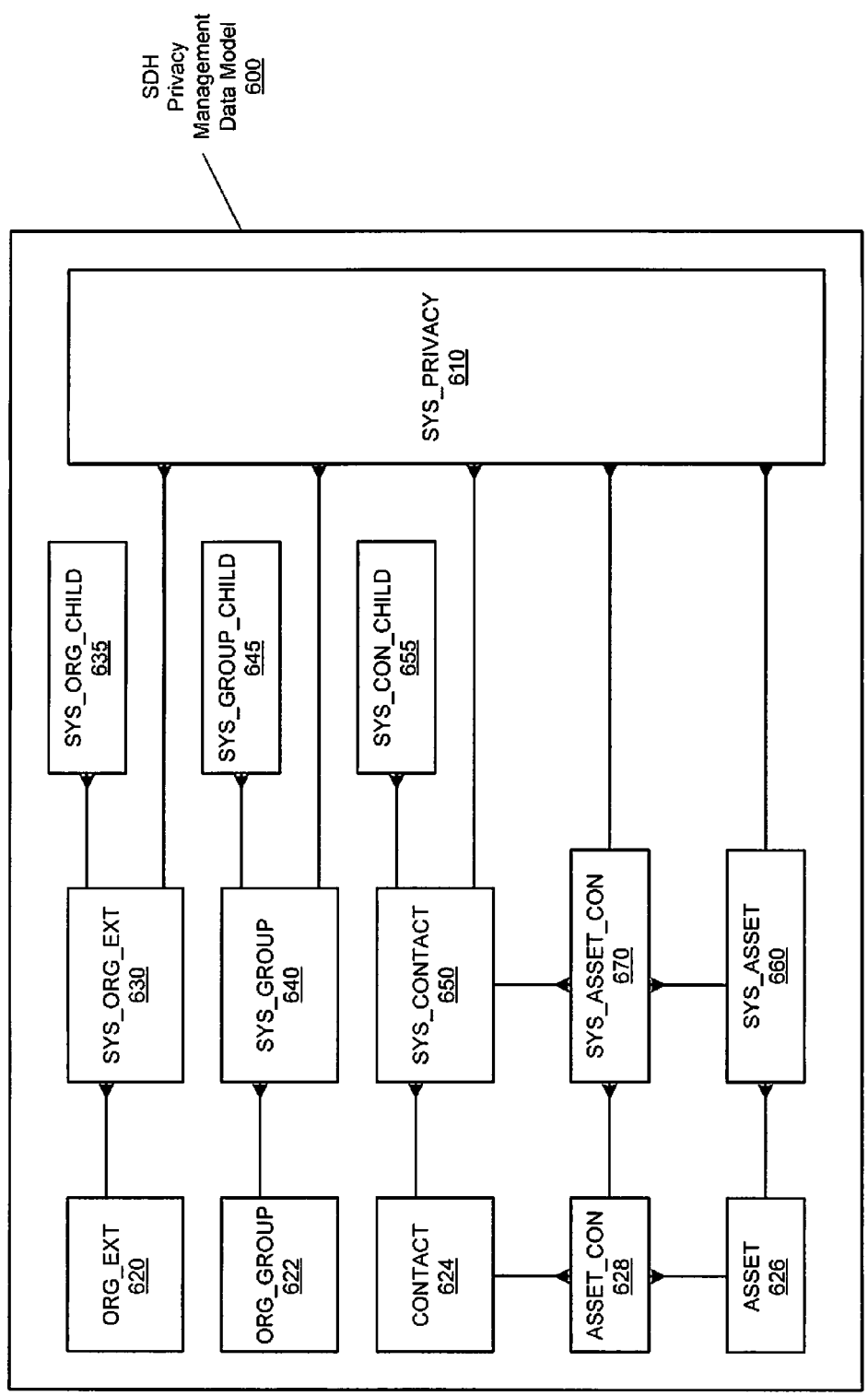
FIG. 6 is a block diagram depicting a privacy management data model for source data and history functions according to embodiments of the present invention.

FIGS. 5 and 6 are block diagrams depicting data models that support a privacy management system according to embodiments of the present invention. FIG. 5 is a block diagram that illustrates a general data model that supports the privacy concepts disclosed herein. A privacy management data model such as a privacy management data model 500 of FIG. 5, is an abstract model that describes how data is represented and accessed within a privacy management system of the present invention. Privacy management data model 500 includes several concepts with relations to one another. The basic concept in privacy management data model 500 is that of privacy (depicted in FIG. 5 as privacy 510). Privacy management data model 500 provides the concept of privacy (privacy 510) to a number of conceptual entities, which include an external organization (depicted in FIG. 5 as ORG_EXT 520), a conceptual contact (depicted in FIG. 5 as CONTACT 530) and a conceptual group (depicted in FIG. 5 as an ORG_GROUP 540). The external organization concept (ORG_EXT 520) has a relationship with the basic privacy concept (privacy 510), and also with an asset concept (an ASSET 550), which also has a relationship with the basic privacy concept (privacy 510). Similarly, the contact concept has a relationship with an asset contact concept (an ASSET_CON 560), which also has a relationship with the basic privacy concept (privacy 510). Further, the asset concept (ASSET 550) and asset contact concept (ASSET_CON 560) also have a relationship with one another.

FIG. 6 is a block diagram depicting a privacy management data model for source data and history (SDH) functions according to embodiments of the present invention. FIG. 6 thus depicts an SDH privacy management data model 600, which includes a number of concepts. As before, the primary concept with an SDH privacy management data model 600 is an SDH system privacy concept (depicted in FIG. 6 as a SYS_PRIVACY 610). Entity concepts within SDH privacy management data model 600 that relate to SYS_PRIVACY 610 include an external organization (depicted in FIG. 6 as ORG_EXT 620), a group concept (depicted in FIG. 6 ORG_GROUP 622), a contact concept (depicted in FIG. 6 as CONTACT 624), an asset concept (depicted in FIG. 6 as ASSET 626), and an asset contact concept (depicted in FIG. 6 as ASSET_CON 628). External organization concept ORG_620 is related to a system concept for an external organization (depicted in FIG. 6 as SYS_ORG EXT 630), which, in turn, has a potential relationship with one or more child representations of such organization (depicted in FIG. 6 as SYS_ORG_CHILD 635). The system concept for an external organization (SYS_ORG_EXT 630) is also related to the main privacy concept (SYS_PRIVACY 610). The group organization concept (ORG_GROUP 622) is related to a system concept for such groups (depicted in FIG. 6 as SYS_GROUP 640), which, in turn, may have one or more relationships with child concepts of this type (depicted in FIG. 6 as SYS_GROUP_CHILD 645). In a similar fashion, the contact concept (CONTACT 624) will have a relationship with a system concept of such contact (depicted in FIG. 6 as SYS_CONTACT 650), which, in turn, may have relationships with one or more child concepts of this type (depicted in FIG. 6 as SYS_CON_CHILD 655). The system contact concept (SYS_CONTACT 650) also has a relationship with the general SDH privacy management data model concept of privacy (SYS_PRIVACY 610). The asset concept (ASSET 626) has a relationship with a system asset concept (depicted in FIG. 6 as SYS_ASSET 660) which, in turn, has a relationship with the general privacy concept (SYS_PRIVACY 610). The assets contact concept (ASSET_CON 628) have a relation with a system concept of asset contact (depicted in FIG. 6 as SYS_ASSET_CON 670), which, in turn, has a relationship with the system's concept of privacy (SYS_PRIVACY 610). As can also be seen in FIG. 6, the contact concept (CONTACT 624) and the asset concept (ASSET 626) each have a relationship with the asset contact concept (ASSET_CON 628). In a similar fashion, the system contact concept (SYS_CONTACT 650) and the system asset concept (SYS_ASSET 660) each have relationships with the system asset contact concept (SYS_ASSET_CON 670).

For a discussion of the implementation details of example data models such as those depicted in FIGS. 5 and 6, please refer to Appendix A, which is attached hereto and is incorporated herein by reference, in their entirety and for all purposes.

Figure 7:
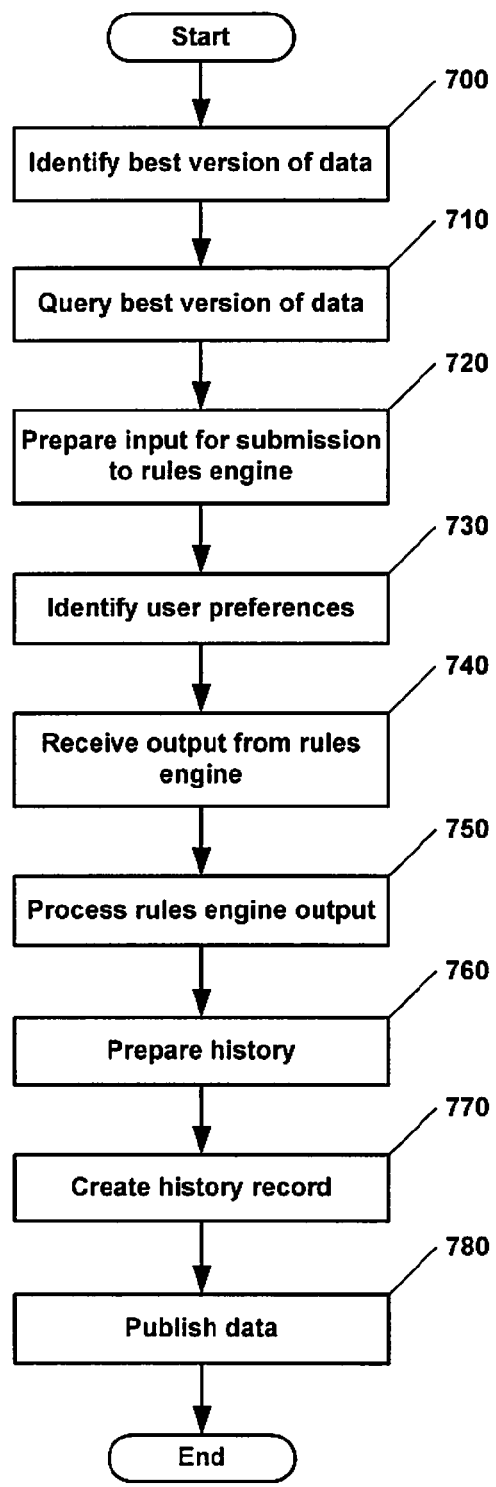
FIG. 7 is a flow diagram that illustrates a privacy process in a privacy management system according to embodiments of the present invention.

FIG. 7 is a flow diagram that illustrates a privacy process in a privacy management system according to embodiments of the present invention. The process begins with the identification of the last version of the desired data (step 700). This data will typically be available to the system from a data source such as master data 150 (having been cleansed by closed-loop data quality module 160), data from master data database 270, data from master data database 355, or the like. Next, the system queries this last version of the data (step 710). Input is then prepared for submission to the rules engine (step 720). Examples of such a rules engine include rules engine 260 and rules engine 380. Once the rules engine input has been prepared, any applicable user preferences are identified (step 730). These user preferences and the rules engine input are then sent to the rules engine, which generates an output that is received by the system (step 740). The rules engine output is then processed (step 750). Once the rules engine output has been processed, an SDH history is prepared (step 760). Once the history has been prepared, a history record is created for the SDH (step 770). The data is then published (step 780).

As noted, FIG. 5 depicts a flow diagram illustrating a process according to one embodiment of the present invention. It is appreciated that operations discussed herein may consist of directly entered commands by a computer system user or by steps executed by application specific hardware modules, but the preferred embodiment includes steps executed by software modules, or by operations performed by hardware modules. The functionality of steps referred to herein may correspond to the functionality of modules or portions of modules.

The operations referred to herein may be modules or portions of modules (e.g., software, firmware or hardware modules). For example, although the described embodiment can include software modules and/or manually entered user commands, the various example modules can be implemented as application-specific hardware modules. If implemented as software modules, embodiments of the present invention can include script, batch or other executable files, or combinations and/or portions of such files. Such software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as the computer system described subsequently herein. Thus, the methods described herein, the operations thereof and modules therefore may be executed on a computer system configured to execute the operations of the method and/or may be executed from computer-readable storage media. The method may be embodied in a machinereadable and/or computer-readable storage medium for configuring a computer system to execute the method. Thus, software modules of embodiments of the present invention may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The software modules described herein may be received by such a computer system, for example, from computer-readable storage media. The computer-readable storage media may be permanently, removably or remotely coupled to the computer system. The computer-readable storage media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. In a UNIX-based embodiment, such software modules may be embodied in a file which may be a device, a terminal, a local or remote file, a socket, a network connection, or other expedient of communication or state change. Other new and various types of computer-readable media may be used to store and/or transmit the software modules discussed herein.

Privacy Management Data Relationship Overview

A majority of privacy laws currently center on privacy protection for consumers. "Consumers," as defined by the GLB Act (GLBA), are "individuals who obtain or have obtained a financial product or service from a company that is to be used primarily for personal, family or household purposes". Consumer Customers with consumer products are subject to GLBA and are entitled to elect privacy preferences that include opting in or out to control sharing of their data. Business Customers of either consumer or commercial products are not covered by GLBA and therefore do not have privacy controls; though they may have privacy preference rights. Privacy laws also provide for non-customer consumer notice and privacy elections. Managing privacy data at the Financial Account Contact level provides customers the flexibility to select which financial accounts to opt-in/out.

TABLE 3

An example of a privacy management data relationship.

| Financial Account Base Table (ASSET) | | | Financial Account Contact Intersection Table (ASSET_CON) | | Contact Base Table (CONTACT) | |
|---|---|---|---|---|---|---|
| Privacy Data on Financial Account | Asset ID | Asset Type | Key to Asset | Privacy Data on Financial Account Contact | Key to Contact | Contact Name | Contact Type |
| | | | | | | | |
| | | | | | | | |
| | | | | | | | |

It will be appreciated that, if a customer chooses to opt-in or opt-out of ALL applicable Financial Accounts, the customer should do so explicitly and the CallCenter application should have "opt-in ALL" and "opt-out ALL" by financial account types and PSC. Alternatively, the customer service representative can opt-in/out one Financial Account at a time for the customer. For privacy compliance purposes, individuals should continue to retain the ability to exercise their privacy options on an account-by-account basis. Another type of privacy management is to capture privacy data solely at the contact level where customer has one set of privacy statuses regardless of how many products he has with a business.

When multiple contacts in a family have business relationships with a company, these contacts collectively belong to a "household". In terms of privacy, data such as phone numbers and addresses associated with a household may be flagged on the "do not call" and/or "do not mail" lists.

For Business Customers, the privacy laws are such that they can express solicitation preferences, but they should not be able to opt out of information sharing. Organizations and Business Customers with commercial products can be stored as "accounts" in the Account (ORG_EXT) table. In addition to enhancements to the Financial Account, Financial Account Contact, Contact, Account and Household tables, the system's data model can be enhanced to store the privacy revision histories of these objects.

Privacy Entities

Following is a summary of entities that can be implemented for use in a privacy management system according to embodiments of the present invention.

TABLE 4

An example of privacy entities.

| Data Entity | Data Model Table(s) |
|---|---|
| Address | ADDR_PER |
| Financial Account (Asset) | ASSET, ASSET |
| Financial Account Contact | ASSET_CON, ASSET_CON |
| Contact | CONTACT, CONTACT |
| Account | ORG_EXT, ORG_EXT |
| Household | ORG_GROUP, ORG_GROUP |

Entity Relationship

A privacy management system according to the present invention supports privacy management by providing a number of entity relationships. Following relationships are in the privacy product features.

Many-to-Many Financial Accounts to Contacts M:M Assets (ASSET): Contacts (CONTACT)

Many-to-Many Companies to Contacts M:M Companies (ORG_EXT): Contacts (CONTACT)

Many-to-Many Households to Contacts M:M Households (ORG GRP): Contacts (CONTACT)

Many-to-Many Contacts to Addresses M:M Contacts (CONTACT): Addresses (ADDR_PER)

Entity Elements

Table 5 illustrates an example of a Financial Account Contact (ASSET_CON) table.

TABLE 5

An example of a Financial Account Contact (ASSET_CON) table.

| Attribute | Data Type | Description |
| --- | --- | --- |
| Financial Account Contact ID | Text | ID for the Financial Account Contact |
| First Name | Text | Person's first name |
| Middle Name | Text | Person's middle name |
| Last Name | Text | Person's last name |
| Address City | Text | City Address |
| Address State | Text | State Address |
| Address Zip Code | Text | Zip Code on the Address |
| Suspect Flag | Bool | OFAC Flag |
| Suppress All Calls | Bool | Suppress Calls |
| Suppress All Emails | Bool | Suppress Emails |
| Suppress All Faxes | Bool | Suppress Faxes |
| Suppress All Mailings | Bool | Suppress Mailings |
| DoNotCall_Federal | Bool | Do not call flag for telephone number listed on National Do Not Call Registry |
| DoNotCall_State | Bool | Do not call flag for telephone number listed on State Do Not Call Registry |
| DoNotCall_Internal | Bool | Do not call flag for telephone number listed on an internal list |
| DoNotSpam_Federal | Bool | Do not spam flag for email address listed on National Do Not Spam Registry |
| DoNotSpam_State | Bool | Do not spam flag for email address listed on State Do Not Spam Registry |
| DoNotSpam_Internal | Bool | Do not spam flag for email address listed on an internal list |
| State PEND Period | Num | Stores the value of the state PEND period passed in from rules. This field is used in conjunction with PEND Start Date, to trigger third party to determine whether the record has elapsed passed the state PEND period. |
| PEND Start Date | Date Time | Date when the contact privacy status is set = PEND. This date is needed to calculate when the contact elapses default PEND period |
| Nonaffiliate_Flg | Text | Store the "LOV" for nonaffiliate third party sharing |
| Nonaffiliate_Flg_Src | Text | Store whether the nonaffiliate flag is elected by user or system |
| Nonaffiliate_Flg_Sys | Text | Store which system did the nonaffiliate flag come from |
| Nonaffiliate_Flg_Mtd | Text | Store what method did the customer use to elect nonaffiliate flag |
| Affiliate_Flg | Text | Store the "LOV" for affiliate sharing |
| Affiliate_Flg_Src | Text | Store whether the affiliate flag is elected by user or system |
| Affiliate_Flg_Sys | Text | Store which system did the affiliate flag come from |
| Affiliate_Flg_Mtd | Text | Store what method did the customer use to elect affiliate flag |
| Tmkg_Flg | Text | Store the "LOV" for telemarketing sharing |
| Tmkg_Flg_Src | Text | Store whether the telemarketing flag is elected by user or system |
| Tmkg_Flg_Sys | Text | Store which system did the telemarketing flag come from |
| Tmkg_Flg_Mtd | Text | Store what method the customer used to elect telemarketing flag |

Table 6 illustrates an example of a Financial Account (ASSET) table.

TABLE 6

An example of a Financial Account (ASSET) table.

| Attribute | Data Type | Description |
| --- | --- | --- |
| Booking Date | DateTime | Date the financial account is created |
| DoNotCall_Federal | Bool | Do not call flag for telephone number listed on National Do Not Call Registry |
| DoNotCall_State | Bool | Do not call flag for telephone number listed on State Do Not Call Registry |
| DoNotSpam_Federal | Bool | Do not spam flag for email address listed on National Do Not Spam Registry |

TABLE 6-continued

An example of a Financial Account (ASSET) table.

| Attribute | Data Type | Description |
|---|---|---|
| DoNotSpam_State | Bool | Do not spam flag for email address listed on State Do Not Spam Registry |
| Privacy State Code (PSC) | Text | Store the "state" value from the contact on the account that has the most restrictive sharing preference |
| State PEND Period | Num | Stores the value of the state PEND period passed in from rules. This field is used in conjunction of PEND Start Date, to trigger third party to determine whether the record has elapsed passed the state PEND period. |
| PEND Start Date | Date Time | Date when the contact privacy status is set = PEND. This date is needed to calculate when the contact elapses default PEND period |
| Suspect Flag | Bool | OFAC Flag |
| Nonaffiliate_Flg | Text | Store which system did the nonaffiliate flag come from |
| Nonaffiliate_Flg_Src | Text | Store what method did the customer use to elect nonaffiliate flag |
| Affiliate_Flg | Text | Store which system did the affiliate flag come from |
| Affiliate_Flg_Src | Text | Store what method did the customer use to elect affiliate flag |
| Tmkg_Flg | Text | Store which system did the telemarketing flag come from |
| Tmkg_Flg_Src | Text | Store what method did the customer use to elect telemarketing flag |
| Tmkg_Flg_Sys | Text | Customer's choice to receive annual notice |
| Tmkg_Flg_Mtd | Text | Store whether the annual notice flag is elected by user or system |

Table 7 illustrates an example of a Contact (CONTACT) table.

TABLE 7

An example of a Contact (CONTACT) table.

| Attribute | Data Type | Description |
|---|---|---|
| Contact ID | Text | ID for contact |
| First Name | Text | Person's first name |
| Middle Name | Text | Person's middle name |
| Last Name | Text | Person's last name |
| Address State | Text | State Address |
| Suppress All Calls | Bool | Suppress Calls |
| Suppress All Emails | Bool | Suppress Emails |
| Suppress All Faxes | Bool | Suppress Faxes |
| Suppress All Mailings | Bool | Suppress Mailings |
| DoNotCall_Federal | Bool | Do not call flag for telephone number listed on National Do Not Call Registry |
| DoNotCall_State | Bool | Do not call flag for telephone number listed on State Do Not Call Registry |
| DoNotSpam_Federal | Bool | Do not Spam flag for email address listed on National Do Not Spam Registry |
| DoNotSpam_State | Bool | Do not spam flag for email address listed on State Do Not Spam Registry |
| Suspect Flag | Bool | OFAC Flag |
| State PEND Period | Num | Stores the value of the state PEND period passed in from rules. This field is used in conjunction of PEND Start Date, to trigger third party to determine whether the record has elapsed passed the state PEND period. |
| PEND Start Date | Date Time | Date when the contact privacy status is set = PEND. This date is needed to calculate when the contact elapses default PEND period |
| Nonaffiliate_Flg | Text | Store the "LOV" for nonaffiliate third party sharing |
| Nonaffiliate_Flg_Src | Text | Store whether the nonaffiliate flag is elected by user or system |
| Nonaffiliate_Flg_Sys | Text | Store which system did the nonaffiliate flag come from |
| Nonaffiliate_Flg_Mtd | Text | Store what method did the customer use to elect nonaffiliate flag |
| Affiliate_Flg | Text | Store the "LOV" for affiliate sharing |
| Affiliate_Flg_Src | Text | Store whether the affiliate flag is elected by user or system |
| Affiliate_Flg_Sys | Text | Store which system did the affiliate flag come from |
| Affiliate_Flg_Mtd | Text | Store what method did the customer use to elect affiliate flag |
| Tmkg_Flg | Text | Store the "LOV" for telemarketing sharing |
| Tmkg_Flg_Src | Text | Store whether the telemarketing flag is elected by user or system |
| Tmkg_Flg_Sys | Text | Store which system did the telemarketing flag come from |
| Tmkg_Flg_Mtd | Text | Store what method did the customer use to elect telemarketing flag |

Table 8 illustrates an example of an Account (ORG_EXT) table.

TABLE 8

An example of an Account (ORG_EXT) table.

| Attribute | Data Type | Description |
|---|---|---|
| Account ID | Text | ID for account |
| Suspect Flag | Bool | OFAC Flag |
| Suppress All Calls | Bool | Suppress Calls |
| Suppress All Emails | Bool | Suppress Emails |
| Suppress All Faxes | Bool | Suppress Faxes |
| Suppress All Mailings | Bool | Suppress Mailings |
| DoNotCall_Federal | Bool | Do not call flag for telephone number listed on National Do Not Call Registry |
| DoNotCall_State | Bool | Do not call flag for telephone number listed on State Do Not Call Registry |
| DoNotSpam_Federal | Bool | Do not spam flag for email address listed on National Do Not Spam Registry |
| DoNotSpam_State | Bool | Do not spam flag for email address listed on State Do Not Spam Registry |
| Privacy State Code (PSC) | Text | Store the "state" value from the contact on the account that has the most restrictive sharing preference |
| State PEND Period | Num | Stores the value of the state PEND period passed in from rules. This field is used in conjunction of PEND Start Date, to trigger third party to determine whether the record has elapsed passed the state PEND period. |
| PEND Start Date | Date Time | Date when the contact privacy status is set = PEND. This date is needed to calculate when the contact elapses default PEND period |
| Nonaffiliate_Flg | Text | Store the "LOV" for nonaffiliate third party sharing |
| Nonaffiliate_Flg_Src | Text | Store whether the nonaffiliate flag is elected by user or system |
| Nonaffiliate_Flg_Sys | Text | Store which system did the nonaffiliate flag come from |
| Nonaffiliate_Flg_Mtd | Text | Store what method did the customer use to elect nonaffiliate flag |
| Affiliate_Flg | Text | Store the "LOV" for affiliate sharing |
| Affiliate_Flg_Src | Text | Store whether the affiliate flag is elected by user or system |
| Affiliate_Flg_Sys | Text | Store which system did the affiliate flag come from |
| Affiliate_Flg_Mtd | Text | Store what method did the customer use to elect affiliate flag |
| Tmkg_Flg | Text | Store the "LOV" for telemarketing sharing |
| Tmkg_Flg_Src | Text | Store whether the telemarketing flag is elected by user or system |
| Tmkg_Flg_Sys | Text | Store which system did the telemarketing flag come from |
| Tmkg_Flg_Mtd | Text | Store what method did the customer use to elect telemarketing flag |

Table 9 illustrates an example of a Household (ORG_GROUP) table.

TABLE 9

An example of a Household (ORG_GROUP) table.

| Attribute | Data Type | Description |
|---|---|---|
| Household ID | Text | ID for household |
| Suppress All Calls | Bool | Suppress Calls |
| Suppress All Mailings | Bool | Suppress Mailings |
| Suppress All Emails | Bool | Suppress Emails |
| Suppress All Faxes | Bool | Suppress Faxes |
| DoNotCall_Federal | Bool | Do not call flag for telephone number listed on National Do Not Call Registry |
| DoNotCall_State | Bool | Do not call flag for telephone number listed on State Do Not Call Registry |
| DoNotSpam_Federal | Bool | Do not spam flag for email address listed on National Do Not Spam Registry |
| DoNotSpam_State | Bool | Do not spam flag for email address listed on State Do Not Spam Registry |
| Suspect Flag | Bool | OFAC Flag |

Table 10 illustrates an example of a Financial Account Contact History (ASSET_CON) table. This table is created to store the revision history of all the privacy changes associated with a financial account contact.

TABLE 10

An example of a Financial Account Contact History (ASSET_CON) table.

| Attribute | Data Type | Description |
|---|---|---|
| Financial Account Contact ID | Text | ID of Financial Account Contact |

TABLE 10-continued

An example of a Financial Account Contact History (ASSET_CON) table.

| Attribute | Data Type | Description |
| --- | --- | --- |
| First Name | Text | Person's first name |
| Middle Name | Text | Person's middle name |
| Last Name | Text | Person's last name |
| Last Update DateTime | Date Time | Date and time of the last update made to the financial account. The value of the data comes from an external or internal system. |
| Last Update System | Text | System where the last update occurred. It can be an external system or the internal system if the update is done in real-time. |
| External User Name | Text | The user name sent from other system to the system. The field will be blank if the last update to the record is done by an administrator |
| Updated By | Text | If the "Last Update System" = SYSTEM, this field stores the admin login ID. |
| State PEND Period | Num | Stores the value of the state PEND period passed in from rules. This field is used in conjunction of PEND Start Date, to trigger third party to determine whether the record has elapsed passed the state PEND period. |
| PEND Start Date | Date Time | Date when the account privacy status is set = PEND. This date is needed to calculate when the contact elapses default PEND period |
| Nonaffiliate_Flg | Text | Store the "LOV" for nonaffiliate third party sharing |
| Nonaffiliate_Flg_Src | Text | Store whether the nonaffiliate flag is elected by user or system |
| Nonaffiliate_Flg_Sys | Text | Store which system did the nonaffiliate flag come from |
| Nonaffiliate_Flg_Mtd | Text | Store what method did the customer use to elect nonaffiliate flag |
| Affiliate_Flg | Text | Store the "LOV" for affiliate sharing |
| Affiliate_Flg_Src | Text | Store whether the affiliate flag is elected by user or system |
| Affiliate_Flg_Sys | Text | Store which system did the affiliate flag come from |
| Affiliate_Flg_Mtd | Text | Store what method did the customer use to elect affiliate flag |
| Tmkg_Flg | Text | Store the "LOV" for telemarketing sharing |
| Tmkg_Flg_Src | Text | Store whether the telemarketing flag is elected by user or system |
| Tmkg_Flg_Sys | Text | Store which system did the telemarketing flag come from |
| Tmkg_Flg_Mtd | Text | Store what method did the customer use to elect telemarketing flag |
| DoNotCall_Federal | Bool | Do not call flag for telephone number listed on National Do Not Call Registry |
| DoNotCall_State | Bool | Do not call flag for telephone number listed on State Do Not Call Registry |
| DoNotSpam_Federal | Bool | Do not spam flag for email address listed on National Do Not Spam Registry |
| DoNotSpam_State | Bool | Do not spam flag for email address listed on State Do Not Spam Registry |
| Suspect Flag | Bool | OFAC Flag |

Table 11 illustrates an example of a Financial Account History (ASSET) table. This table is created to store the revision history of all the privacy changes associated with a financial account.

TABLE 11

An example of a Financial Account History (ASSET) table.

| Attribute | Data Type | Description |
| --- | --- | --- |
| Booking Date | DateTime | Date the financial account is created |
| Last Update DateTime | Date Time | Date and time of the last update made to the financial account contact. The value of the data comes from an external or internal system. |
| Last Update System | Text | System where the last update occurred. It can be an external system or the internal system if the update is done in real-time. |
| External User Name | Text | The user name sent from other system to the system. The field will be blank if the last update to the record is done by the administrator |
| Updated By | Text | If the "Last Update System" = SYSTEM, this field stores the ID of the administrator who makes the real-time update. |
| Privacy State Code (PSC) | Text | Store the "state" value from the contact on the account that has the most restrictive sharing preference |
| State PEND Period | Num | Stores the value of the state PEND period passed in from rules. This field is used in conjunction of PEND Start Date, to trigger third party to determine whether the record has elapsed passed the state PEND period. |
| PEND Start Date | Date Time | Date when the account privacy status is set = PEND. This date is needed to calculate when the contact elapses default PEND period |
| Nonaffiliate_Flg | Text | Store the "LOV" for nonaffiliate third party sharing |
| Nonaffiliate_Flg_Src | Text | Store whether the nonaffiliate flag is elected by user or system |
| Nonaffiliate_Flg_Sys | Text | Store which system did the nonaffiliate flag come from |
| Nonaffiliate_Flg_Mtd | Text | Store what method did the customer use to elect nonaffiliate flag |
| Affiliate_Flg | Text | Store the "LOV" for affiliate sharing |
| Affiliate_Flg_Src | Text | Store whether the affiliate flag is elected by user or system |

TABLE 11-continued

An example of a Financial Account History (ASSET) table.

| Attribute | Data Type | Description |
| --- | --- | --- |
| Affiliate_Flg_Sys | Text | Store which system did the affiliate flag come from |
| Affiliate_Flg_Mtd | Text | Store what method did the customer use to elect affiliate flag |
| Tmkg_Flg | Text | Store the "LOV" for telemarketing sharing |
| Tmkg_Flg_Src | Text | Store whether the telemarketing flag is elected by user or system |
| Tmkg_Flg_Sys | Text | Store which system did the telemarketing flag come from |
| Tmkg_Flg_Mtd | Text | Store what method did the customer use to elect telemarketing flag |
| DoNotCall_Federal | Bool | Do not call flag for telephone number listed on National Do Not Call Registry |
| DoNotCall_State | Bool | Do not call flag for telephone number listed on State Do Not Call Registry |
| DoNotSpam_Federal | Bool | Do not spam flag for email address listed on National Do Not Spam Registry |
| DoNotSpam_State | Bool | Do not spam flag for email address listed on State Do Not Spam Registry |
| Suspect Flag | Bool | OFAC Flag |

Table 12 illustrates an example of a Contact History (CONTACT) table. A privacy management system according to the present invention has a revision history table for contacts.

TABLE 12

An example of a Contact History (CONTACT) table.

| Attribute | Data Type | Description |
| --- | --- | --- |
| Contact ID | Text | ID for contact |
| Suppress All Calls | Bool | Suppress Calls |
| Suppress All Emails | Bool | Suppress Emails |
| Suppress All Faxes | Bool | Suppress Faxes |
| Suppress All Mailings | Bool | Suppress Mailings |
| Suspect Flag | Bool | OFAC Flag |
| Last Update DateTime | Date Time | Date and time of the last update made to the financial account contact. The value of the data comes from an external or internal system. |
| Last Update System | Text | System where the last update occurred. It can be an external system or the system if the update is done in real-time. |
| External User Name | Text | The user name sent from other system to the system. The field will be blank if the last update to the record is done by an administrator |
| Updated By | Text | If the "Last Update System" = SYSTEM, this field stores the ID of the administrator who makes the real-time update. |
| State PEND Period | Num | Stores the value of the state PEND period passed in from rules. This field is used in conjunction of PEND Start Date, to trigger third party to determine whether the record has elapsed passed the state PEND period. |
| PEND Start Date | Date Time | Date when the account privacy status is set = PEND. This date is needed to calculate when the contact elapses default PEND period |
| Nonaffiliate_Flg | Text | Store the "LOV" for nonaffiliate third party sharing |
| Nonaffiliate_Flg_Src | Text | Store whether the nonaffiliate flag is elected by user or system |
| Nonaffiliate_Flg_Sys | Text | Store which system did the nonaffiliate flag come from |
| Nonaffiliate_Flg_Mtd | Text | Store what method did the customer use to elect nonaffiliate flag |
| Affiliate_Flg | Text | Store the "LOV" for affiliate sharing |
| Affiliate_Flg_Src | Text | Store whether the affiliate flag is elected by user or system |
| Affiliate_Flg_Sys | Text | Store which system did the affiliate flag come from |
| Affiliate_Flg_Mtd | Text | Store what method did the customer use to elect affiliate flag |
| Tmkg_Flg | Text | Store the "LOV" for telemarketing sharing |
| Tmkg_Flg_Src | Text | Store whether the telemarketing flag is elected by user or system |
| Tmkg_Flg_Sys | Text | Store which system did the telemarketing flag come from |
| Tmkg_Flg_Mtd | Text | Store what method did the customer use to elect telemarketing flag |
| DoNotCall_Federal | Bool | Do not call flag for telephone number listed on National Do Not Call Registry |
| DoNotCall_State | Bool | Do not call flag for telephone number listed on State Do Not Call Registry |
| DoNotSpam_Federal | Bool | Do not spam flag for email address listed on National Do Not Spam Registry |
| DoNotSpam_State | Bool | Do not spam flag for email address listed on State Do Not Spam Registry |

Table 13 illustrates an example of an Account History (ACCOUNT) table. A privacy management system according to the present invention has a revision history table for accounts.

TABLE 13

An example of an Account History (ACCOUNT) table.

| Attribute | Data Type | Description |
| --- | --- | --- |
| Account ID | Text | ID of the account |
| Last Update DateTime | Date Time | Date and time of the last update made to the financial account contact. The value of the data comes from an external or internal system. |
| Last Update System | Text | System where the last update occurred. It can be an external system or the system if the update is done in real-time. |
| External User Name | Text | The user name sent from other system to the system. The field will be blank if the last update to the record is done by the administrator |
| Updated By | Text | If the "Last Update System" = SYSTEM, this field stores the ID of the administrator who makes the real-time update. |
| Privacy State Code (PSC) | Text | Store the "state" value from the contact on the account that has the most restrictive sharing preference |
| State PEND Period | Num | Stores the value of the state PEND period passed in from rules. This field is used in conjunction of PEND Start Date, to trigger third party to determine whether the record has elapsed passed the state PEND period. |
| PEND Start Date | Date Time | Date when the account privacy status is set = PEND. This date is needed to calculate when the contact elapses default PEND period |
| Nonaffiliate_Flg | Text | Store the "LOV" for nonaffiliate third party sharing |
| Nonaffiliate_Flg_Src | Text | Store whether the nonaffiliate flag is elected by user or system |
| Nonaffiliate_Flg_Sys | Text | Store which system did the nonaffiliate flag come from |
| Nonaffiliate_Flg_Mtd | Text | Store what method did the customer use to elect nonaffiliate flag |
| Affiliate_Flg | Text | Store the "LOV" for affiliate sharing |
| Affiliate_Flg_Src | Text | Store whether the affiliate flag is elected by user or system |
| Affiliate_Flg_Sys | Text | Store which system did the affiliate flag come from |
| Affiliate_Flg_Mtd | Text | Store what method did the customer use to elect affiliate flag |
| Tmkg_Flg | Text | Store the "LOV" for telemarketing sharing |
| Tmkg_Flg_Src | Text | Store whether the telemarketing flag is elected by user or system |
| Tmkg_Flg_Sys | Text | Store which system did the telemarketing flag come from |
| Tmkg_Flg_Sys | Text | Store which system did the telemarketing flag come from |
| DoNotCall_Federal | Bool | Do not call flag for telephone number listed on National Do Not Call Registry |
| DoNotCall_State | Bool | Do not call flag for telephone number listed on State Do Not Call Registry |
| DoNotCall_Internal | Bool | Do not call flag for telephone number listed on internal Do Not Call Registry |
| DoNotSpam_Federal | Bool | Do not spam flag for email address listed on National Do Not Spam Registry |
| DoNotSpam_State | Bool | Do not spam flag for email address listed on State Do Not Spam Registry |
| DoNotSpam_Internal | Bool | Do not spam flag for email address listed on internal Do Not Spam Registry |
| Suspect Flag | Bool | OFAC Flag |

Table 14 illustrates an example of a Household History (ORG_GROUP) table. This table is created to store the revision history of all the privacy changes associated with a household.

TABLE 14

An example of a Household History (ORG_GROUP) table.

| Attribute | Data Type | Description |
| --- | --- | --- |
| Household ID | Text | ID for household |
| Last Update DateTime | Date Time | Date and time of the last update made to the financial account contact. The value of the data comes from an external or internal system. |
| Last Update System | Text | System where the last update occurred. It can be an external system or the system if the update is done in real-time. |
| External User Name | Text | The user name sent from other system to the system. The field will be blank if the last update to the record is done by an administrator |
| Updated By | Text | If the "Last Update System" = SYSTEM, this field stores the ID of the administer who makes the real-time update. |
| Suppress All Calls | Bool | Suppress Calls |
| Suppress All Mailings | Bool | Suppress Mailings |
| Suppress All Emails | Bool | Suppress Emails |

TABLE 14-continued

An example of a Household History (ORG_GROUP) table.

| Attribute | Data Type | Description |
|---|---|---|
| Suppress All Faxes | Bool | Suppress Faxes |
| DoNotCall_Federal | Bool | Do not call flag for telephone number listed on National Do Not Call Registry |
| DoNotCall_State | Bool | Do not call flag for telephone number listed on State Do Not Call Registry |
| DoNotSpam_Federal | Bool | Do not spam flag for email address listed on National Do Not Spam Registry |
| DoNotSpam_State | Bool | Do not spam flag for email address listed on State Do Not Spam Registry |
| Suspect Flag | Bool | OFAC Flag |

An Example of a Business Integration Application for Privacy Requirement

To support a privacy management system according to the present invention, the following business integration processes are provided for the synchronization of privacy data associated with account, contact, financial account, financial account contact and household objects. Table 15 is an example of a customer lifecycle management table.

TABLE 15

An example of a customer lifecycle management table.
Business Integration Process

| Sync/Request Contact | Source |
| | SYSTEM |
| | Target |
| Sync/Request Account | Source |
| | SYSTEM |
| | Target |
| Sync/Request Financial Account | Source |
| | SYSTEM |
| | Target |
| Sync/Request Household | Source |
| | SYSTEM |
| | Target |

An Example of a Synchronization/Request Financial Account

Figure 8:
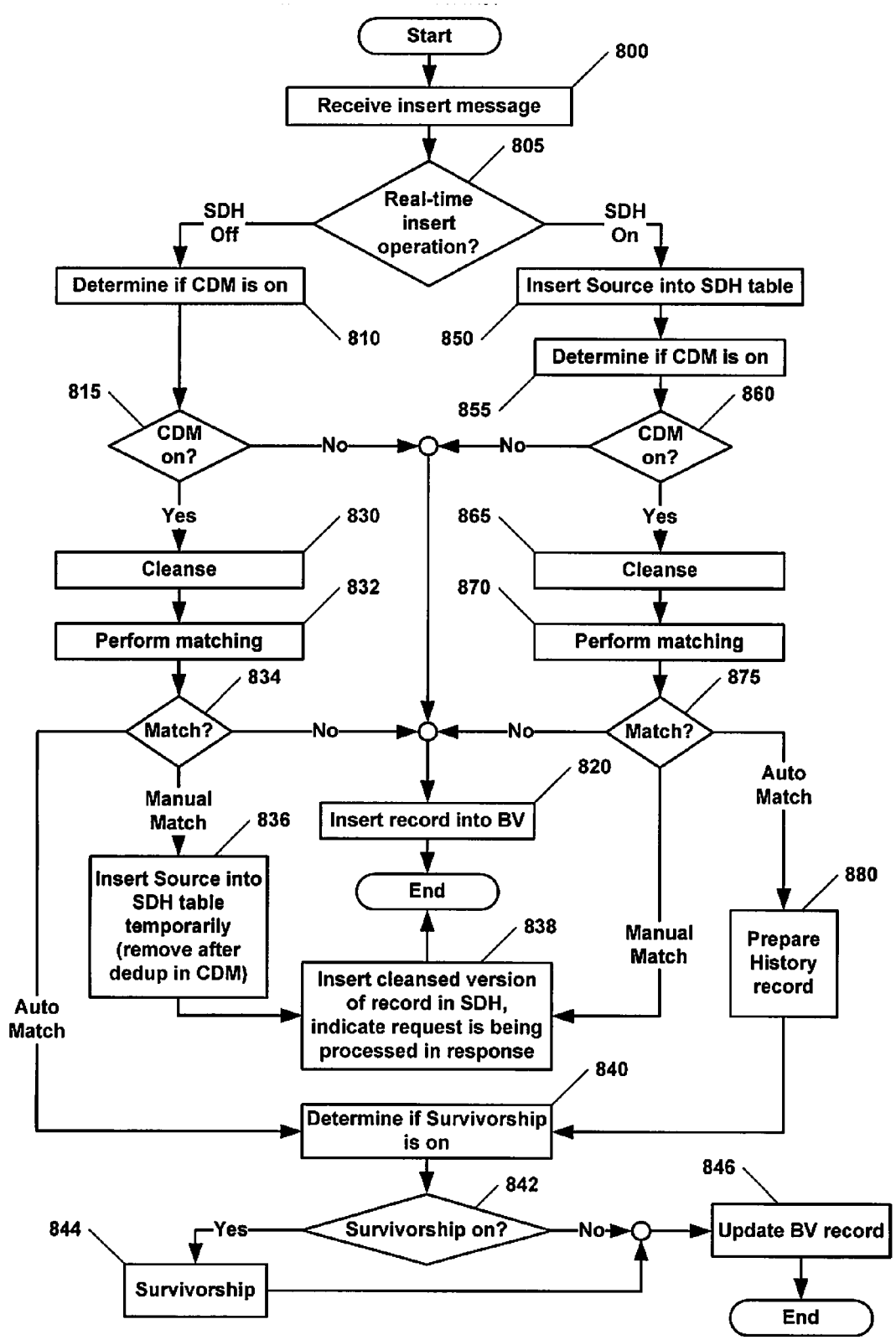
FIG. 8 is a flow diagram illustrating a process for synchronizing and requesting privacy data associated with contacts, accounts, financial accounts and households, among other such associations, for a business integration process according to embodiments of the present invention.

FIG. 8 is a flow diagram illustrating a process for synchronizing and requesting privacy data associated with contacts, accounts, financial accounts and households, among other such associations, for a business integration process. More particularly, FIG. 8 illustrates an example of a process according to embodiments of the present invention of a synchronized/request financial account business integration process. This process synchronizes and updates financial account and its associated financial account contacts between a privacy management system and other systems. The process begins with the receipt of an insert message (step 800). A determination is then made as to whether the insert operation is a real-time insert operation (step 805). If source data history is off in a real-time insert operation, a determination is made as to whether customer data management (CDM) is on (step 810). If CDM is not on (step 815), the record identified by the insert message is inserted into the BV (step 820). The process then concludes.

If CDM is on (step 815), the record is cleansed (step 830). Once the record has been cleansed, matching is performed (step 832). If no match is found (step 834), the record indicated by the insert message is inserted into the BV (step 820), and the process concludes.

If the match is a manual match (step 834), the source is inserted into the SDH table temporarily (though the source will be removed after deduplication in CDM) (step 836). Next, a cleansed version of the record is inserted into the SDH, and an indication is made in the response that the request is being processed (step 838). The process then concludes.

If, however, an auto match is detected (step 834), a determination is then made as to whether or not survivorship is on (step 840). If it is determined that survivorship is on (step 842), survivorship processing is performed (step 844). Once the requisite survivorship processing has been performed, the BV record is updated (step 846). Otherwise, the BV record is simply updated (steps 840 and 846). In either case, The process then concludes.

Returning to very early in the process depicted in FIG. 7, if the insert operation is a real-time insert operation and SDH is on (step 805), the source is inserted into the SDH table (step 850). Next, a determination is made as to whether customer data management is on (step 855). If customer data management is not on (step 860), the record indicated in the insert message is inserted into the BV (step 820), and the process concludes.

However, if customer data management is on (step 860), the record is cleansed (step 865), and matching is performed (step 870). If no match exists (step 875), the record is inserted into the BV (step 820), and then the process concludes. If the match is a manual match (step 875), the cleansed version of the record is inserted into the SDH, and an indication is made that the request is being processed (step 838). The process then concludes.

If an auto match is indicated (step 875), a history record is prepared (step 880). A determination is then made as to whether survivorship is on (step 840). If survivorship is on (step 842), survivorship processing is performed (step 844). The BV record is then updated (step 846). If survivorship is not on (step 842), then the BV record is simply updated (steps 840 and 846). In either case, the process then concludes.

Table 16 illustrates an example of an integration characteristic table.

TABLE 16

An example of an integration characteristic table.

| Type | Sync/Update/Request BIP |
|---|---|
| Mode | Asynchronous: Near-real Time; Asynchronous: Batch |
| Connectivity | Near-real Time: XML via JMS messaging using JMS Adapter; Batch: flat file read using File Adapter |

TABLE 16-continued

An example of an integration characteristic table.

| | |
|---|---|
| VBC or Data Replication | Data Replication |
| Trigger | "Submit Financial Account" button |
| Precondition | Financial Account and/or Financial Account Contact created or updated in. |
| Post Condition | Financial Account and/or Financial Account Contact updated including privacy statuses. |
| BO | Account and Account Contact |

Process Steps:
1 Customer service representative creates or updates a financial account/contact. Upon completion of the record, the customer service representative clicks on the "Submit Financial Account" to send the new/updated financial account/contact to the system. All the contacts associated with the financial account will be submitted to the system.
2 Synchronize financial fccount business integration process is triggered via a scheduled or an ad hoc batch job.
2.1 Business integration process AF receives the batch request and checks that the number of records on the file matches the record counts sent. Else the business integration process raises exception and writes to log file.
2.2 File adapter reads one record at a time from the file and packages an AO of financial account and contacts. AF passes the AO to TF.
3 Sync Financial Account business integration process is triggered real-time via workflow.
3.1 JMS Adapter reads the incoming message and packages an AO of financial account and contact. AF passes the AO to TF.
4 TF validates the message to ensure the required fields are not null, else raises exception. If validation is successful, transforms the AO to CO and passes CO to IF.
5 The IF has the logics such that if the record is received from a third party system, trigger the COM to TF. Go to step 6. If the record is received from the system, IF triggers the COM to TF. Go to step 9.
6 IF invokes COM to TF.
7 COM to TF validates and converts CO to ASI. AF is called to submit data to the system.
7.1 The system receives the new/updated financial account successfully, else raises exception.
7.2 The system calls third party to determine privacy status.
7.3 The system updates the database and sends the updated financial account message to AF.
8 AF receives data from the system and calls the system to COM TF. TF passes the updated AO to IF.
9 IF calls COM to TF, which converts CO to ASI and calls AF.
10 AF sends the updated financial account and contact data, including privacy statuses to CallCenter.
11 CallCenter is updated with the correct privacy data.

Table 17 illustrates an example of a Common Object Definition table.

TABLE 17

An example of a Common Object Definition table.

| Field | Description |
|---|---|
| Account # | ID of the account |
| Account Name | Name of the account |
| Account Type | Type of the account |
| Account Status | Status of the account |
| Booking Date | Date the financial account is created |
| Last Update DateTime | Date and time of the last update made to the financial account. The value of the data comes from an external system. |
| Last Update System | System where the last update occurred |
| External User Name | The external system's user name that updates the financial account |
| External User Login | The external system's user login id that updates the financial account |
| Status | Status of the account |
| Nonaffiliate_Flg | Store the "LOV" for nonaffiliate third party sharing |
| Nonaffiliate_Flg_Src | Store whether the nonaffiliate flag is elected by user or system |
| Nonaffiliate_Flg_Sys | Store which system did the nonaffiliate flag come from |
| Nonaffiliate_Flg_Mtd | Store what method did the customer use to elect sharing choice |
| Affiliate_Flg | Store the "LOV" for affiliate sharing |
| Affiliate_Flg_Src | Store whether the affiliate flag is elected by user or system |
| Affiliate_Flg_Sys | Store which system did the affiliate flag come from |
| Affiliate_Flg_Mtd | Store what method did the customer use to elect sharing choice |
| Tmkg_Flg | Store the "LOV" for telemarketing sharing |
| Tmkg_Flg_Src | Store whether the telemarketing flag is elected by user or system |
| Tmkg_Flg_Sys | Store which system did the telemarketing flag come from |
| Tmkg_Flg_Mtd | Store what method did the customer use to elect sharing choices |
| DoNotCall_Federal | Do not call flag for telephone number listed on National Do Not Call Registry |
| DoNotCall_State | Do not call flag for telephone number listed on State Do Not Call Registry |
| DoNotSpam_Federal | Do not spam flag for email address listed on National Do Not Spam Registry |
| DoNotSpam_State | Do not spam flag for email address listed on State Do Not Spam Registry |
| OFAC Flag | OFAC flag |
| Financial Account Contact ID | Contact ID |
| Financial Account Contact Type | Type of contact on the account |
| Last Update DateTime | Date and time of the last update made to the financial account contact. The value of the data comes from an external system. |

TABLE 17-continued

An example of a Common Object Definition table.

| Field | Description |
|---|---|
| Last Update System | System where the last update occurred |
| External User Name | The external system's user name that updates the financial account contact |
| External User Login | The external system's user login id that updates the financial account contact |
| First Name | Person's first name |
| Middle Name | Person's middle name |
| Last Name | Person's last name |
| Address Type | Type of address |
| Address Street | Street Address |
| Address City | City Address |
| Address State | State Address |
| Address Zip Code | Zip Code Address |
| Home Phone | Home phone # |
| Work Phone | Work phone # |
| Fax | Fax # |
| Email | Email address |
| Suppress All Calls | Suppress Calls |
| Suppress All Emails | Suppress Emails |
| Suppress All Faxes | Suppress Faxes |
| Suppress All Mailings | Suppress Mailings |
| OFAC Flag | OFAC flag |
| Nonaffiliate_Flg | Store the "LOV" for Nonaffiliate third party sharing |
| Nonaffiliate_Flg_Src | Store whether the source of the Nonaffiliate flag is elected by user or system |
| Nonaffiliate_Flg_Sys | Store which system did the Nonaffiliate flag come from |
| Nonaffiliate_Flg_Mtd | Store what method did the customer use to elect sharing choice |
| Affiliate_Flg | Store the "LOV" for affiliate sharing |
| Affiliate_Flg_Src | Store whether the source of the affiliate flag is elected by user or system |
| Affiliate_Flg_Sys | Store which system did the affiliate flag come from |
| Affiliate_Flg_Mtd | Store what method did the customer use to elect sharing choice |
| Tmkg_Flg | Store the "LOV" for telemarketing sharing |
| Tmkg_Flg_Src | Store whether the source of the telemarketing flag is elected by user or system |
| Tmkg_Flg_Sys | Store which system did the telemarketing flag come from |
| Tmkg_Flg_Mtd | Store what method did the customer use to elect sharing choices |
| DoNotCall_Federal | Do not call flag for telephone number listed on National Do Not Call Registry |
| DoNotCall_State | Do not call flag for telephone number listed on State Do Not Call Registry |
| DoNotSpam_Federal | Do not spam flag for email address listed on National Do Not Spam Registry |
| DoNotSpam_State | Do not spam flag for email address listed on State Do Not Spam Registry |

A Data Sent/Data Received BIP is also described that is a synchronization business integration process, and the data sent and data received are the same. All financial account and financial account contact data is updated and synchronized in the applications when the transaction is complete. Table 18 illustrates an example of a Validation and Error Handling table. All error messages and time-out parameters are configurable. The error message is displayed in a pop-up message if the transaction is synchronous.

TABLE 18

An example of a Validation and Error Handling table.
Validation/Error Condition

| 1 | Missing required field in the message |
| 2 | State Address is invalid for one of the contacts. |
| 3 | The system or third party system is not available while Integration Server is available. |

A Synchronization/Request Household business integration process is now described. This process synchronizes and updates Household and all its associated Contacts between the system and other systems. The Integration Characteristic for Synchronization/Request Household is the same as the Synchronization/Request Financial Account business integration process, but with Household object and Household Contact objects. The trigger is a "Sync Household" button. The Integration Process Flow is the same as that for the Synchronization/Request Financial Account business integration process, but with Household object and Household Contact objects. Table 19 illustrates an example of a Common Object Definition for a Synchronization/Request Financial Account.

TABLE 19

An example of a Common Object Definition for a Synchronization/Request Household.

| Field | Description |
|---|---|
| Household # | ID of the household |
| Head of the Household | Primary contact of the household |
| Household Name | Name of the household |
| Income | Income of the household |
| Address | Household address |
| Phone | Household phone |
| Fax | Household fax |
| Email | Household email |
| Suppress All Calls | Suppress All Calls |

TABLE 19-continued

An example of a Common Object Definition for a Synchronization/Request Household.

| Field | Description |
|---|---|
| Suppress All Emails | Suppress All Emails |
| Suppress All Faxes | Suppress All Faxes |
| Suppress All Mailings | Suppress All Mailings |
| DoNotCall_Federal | Do not call flag for telephone number listed on National Do Not Call Registry |
| DoNotCall_State | Do not call flag for telephone number listed on State Do Not Call Registry |
| DoNotSpam_Federal | Do not spam flag for email address listed on National Do Not Spam Registry |
| DoNotSpam_State | Do not spam flag for email address listed on State Do Not Spam Registry |
| OFAC Flag | OFAC flag |
| Contact Name | Name of the contact |
| Date of Birth | DOB of the contact |
| Income | Income of the contact |
| Relationship | Type of contact for the household |
| Date Entered | Date/Time of when the contact is entered |
| Same privacy data as that of financial account contact | |

A Data Sent/Data Received BIP is also described that is a synchronization business integration process, and the data sent and data received are the same. All household and contact data is updated and synchronized in the system when the transaction is complete. Table 20 illustrates an example of a Validation and Error Handling table. All error messages and time-out parameters are configurable. The error messages are displayed in a pop-up message if the transaction is synchronous, and the error messages and time-out parameters are configurable.

TABLE 20

An example of a Validation and Error Handling table.

| # | Validation/Error Condition |
|---|---|
| 1 | Missing required field in the message |
| 2 | State Address is invalid for one of the contacts. |
| 3 | The system or third party system is not available while Integration Server is available. |

A Synchronization/Request Contact business integration process is now described. This process synchronizes and updates Contacts between the system and other systems. The Integration Characteristic for Synchronization/Request Contacts is the same as the Synchronization/Request Financial Account business integration process, but with Contact object. The trigger is a "Sync Contact" button. The Integration Process Flow is the same as that for the Synchronization/Request Financial Account business integration process, but with Contact object. Table 21 illustrates an example of a Common Object Definition for a Synchronization/Request Contact.

TABLE 21

An example of a Common Object Definition for a Synchronization/Request Contact.

| Field | Description |
|---|---|
| Contact ID | ID of the Contact |
| Last Update DateTime | Date and time of the last update made to the financial account contact. The value of the data comes from an external system. |
| Last Update System | System where the last update occurred |
| External User Name | The external system's user name that updates the financial account contact |
| External User Login | The external system's user login id that updates the financial account contact |
| First Name | Person's first name |
| Middle Name | Person's middle name |
| Last Name | Person's last name |
| Address Type | Type of address |
| Address Street | Street Address |
| Address City | City Address |
| Address State | State Address |
| Address Zip Code | Zip Code Address |
| Home Phone | Home phone # |
| Work Phone | Work phone # |
| Fax | Fax # |
| Email | Email address |
| Suppress All Calls | Suppress Calls |
| Suppress All Emails | Suppress Emails |
| Suppress All Faxes | Suppress Faxes |
| Suppress All Mailings | Suppress Mailings |
| OFAC Flag | OFAC flag |
| Nonaffiliate_Flg | Store the "LOV" for Nonaffiliate third party sharing |
| Nonaffiliate_Flg_Src | Store whether the source of the Nonaffiliate flag is elected by user or system |
| Nonaffiliate_Flg_Sys | Store which system did the Nonaffiliate flag come from |
| Nonaffiliate_Flg_Mtd | Store what method did the customer use to elect sharing choice |
| Affiliate_Flg | Store the "LOV" for affiliate sharing |
| Affiliate_Flg_Src | Store whether the source of the affiliate flag is elected by user or system |
| Affiliate_Flg_Sys | Store which system did the affiliate flag come from |
| Affiliate_Flg_Mtd | Store what method did the customer use to elect sharing choice |
| Tmkg_Flg | Store the "LOV" for telemarketing sharing |
| Tmkg_Flg_Src | Store whether the source of the telemarketing flag is elected by user or system |
| Tmkg_Flg_Sys | Store which system did the telemarketing flag come from |
| Tmkg_Flg_Mtd | Store what method did the customer use to elect sharing choices |

TABLE 21-continued

An example of a Common Object Definition for a Synchronization/Request Contact.

| Field | Description |
| --- | --- |
| DoNotCall_Federal | Do not call flag for telephone number listed on National Do Not Call Registry |
| DoNotCall_State | Do not call flag for telephone number listed on State Do Not Call Registry |
| DoNotSpam_Federal | Do not spam flag for email address listed on National Do Not Spam Registry |
| DoNotSpam_State | Do not spam flag for email address listed on State Do Not Spam Registry |

A Synchronization/Request Account business integration process is now described. This process synchronizes and updates Accounts between the system and other systems. The Integration Characteristic for Synchronization/Request Account is the same as the Synchronization/Request Financial Account business integration process, but with Account object. The trigger is a "Sync Account" button. The Integration Process Flow is the same as that for the Synchronization/Request Financial Account business integration process, but with Account object. Table 22 illustrates an example of a Common Object Definition for a Synchronization/Request Account.

TABLE 22

An example of a Common Object Definition for a Synchronization/Request Account.

| Field | Description |
| --- | --- |
| Account Name | Name of the account |
| Account Type | Type of the account |
| Account Status | Status of the account |
| Address | Account address |
| Phone | Account phone |
| Fax | Account fax |
| Email | Account email |
| Suppress All Calls | Suppress All Calls |
| Suppress All Emails | Suppress All Emails |
| Suppress All Faxes | Suppress All Faxes |
| Suppress All Mailings | Suppress All Mailings |
| Nonaffiliate_Flg | Store the "LOV" for Nonaffiliate third party sharing |
| Nonaffiliate_Flg_Src | Store whether the source of the Nonaffiliate flag is elected by user or system |
| Nonaffiliate_Flg_Sys | Store which system did the Nonaffiliate flag come from |
| Nonaffiliate_Flg_Mtd | Store what method did the customer use to elect sharing choice |
| Affiliate_Flg | Store the "LOV" for affiliate sharing |
| Affiliate_Flg_Src | Store whether the source of the affiliate flag is elected by user or system |
| Affiliate_Flg_Sys | Store which system did the affiliate flag come from |
| Affiliate_Flg_Mtd | Store what method did the customer use to elect sharing choice |
| Tmkg_Flg | Store the "LOV" for telemarketing sharing |
| Tmkg_Flg_Src | Store whether the source of the telemarketing flag is elected by user or system |
| Tmkg_Flg_Sys | Store which system did the telemarketing flag come from |
| Tmkg_Flg_Mtd | Store what method did the customer use to elect sharing choices |
| DoNotCall_Federal | Do not call flag for telephone number listed on National Do Not Call Registry |
| DoNotCall_State | Do not call flag for telephone number listed on State Do Not Call Registry |
| DoNotSpam_Federal | Do not spam flag for email address listed on National Do Not Spam Registry |
| DoNotSpam_State | Do not spam flag for email address listed on State Do Not Spam Registry |
| OFAC Flag | OFAC flag |

Connector to Third Party Requirement

Semantic Modeling modeling is now described. The English-based business rules building blocks are called "Concepts," also known as the "vocabularies," and the vocabularies contain "entities," "values" and "units". To create business rules specific to a privacy management system according to the present invention, the semantic modeling involves describing the business objects using the third party vocabularies. Moreover, these vocabularies must be in the context of current privacy regulations and specific to financial services industry. Out-of-the-box, a complete set of privacy vocabularies are modeled and enabled for privacy rules creation around the system's Financial Accounts, Financial Accounts Contacts, Contacts, Accounts and Households business objects. These objects' attributes and relationships are expressed as the entity "values" and "relations" in third party.

With regard to privacy integration, the connector includes the integration infrastructure, administration, trigger mechanism and server-processing components, so the system can invoke third party rules engine readily once both software are installed and configured. The connector and integration services provides configurable system parameters to support High Availability deployments where there may be multiple instances of the system and third party applications and databases. When a failover occurs, the connection from third party to the system, or the system to third party can switch to the backup the system or third party instance via the configurable system parameters.

Once the connector is configured, the objective of the privacy integration is such that the IT involvement is minimized in response to new rules. The message structure and content of the third party integration services are designed and developed to meet this objective. A set of pre-defined service templates covering rules operations, such as query, update, insert and delete, invoke a variety of privacy rules. If a new privacy rule is created based on the privacy vocabularies provided, there is no integration change necessary because the new rule is based on an existing third party entity, which is mapped to a system integration object. However, if a new privacy rule requires a new vocabulary, a change to the system's data model is required. In this case, the impacted table is extended; the new integration components need to be added to the existing integration objects; and the new message fields need to be added to the existing integration services to third party.

Baseline Privacy Rules

1) New Customer. When a new customer is created with no privacy preferences specified, the law states that a period of waiting time is required to allow customer to exercise his opt-in/out rights before sharing the customer information. If the PEND period expires and the customer does not opt-in/out, the following regulatory default values for the four privacy fields are to be populated. An 'Invalid State' address includes international and military addresses, and any U.S. address that is not recognized by the USPS.
2) Evaluate Privacy core logic. This core logic is executed whenever there is a change to a Financial Account or Financial Account Contact. For example, a customer calls to opt-in. The logic routine is as follow:
   a. Set privacy hierarchy: 1 OUT Requested, 2 OUT Default, 3 PEND Default, 4 IN Default, and 5 IN Request.
   b. Set privacy for each contact on the account according to contact's garage address state.
   c. Set PSC at the account based on the most restrictive garage address state among all the contacts
   d. Roll-up the contact statuses based on the privacy hierarchy defined in a) to determine the Financial Account privacy status
   e. Set Privacy Notice Types based on PSC.
3) Address Change.
   a. Set privacy flags to PEND and reset the Account PEND Date parameter.
   b. Evaluate Privacy (see #2)
4) Account Type Change.
   a. If type changes from Consumer to Business, set all privacy flags to IN
      i. Except if there is an OUT flag, retain the OUT status
   b. If type changes from Business to Consumer, set all flags to PEND. Set Primary's Annual Notice Flag=Y
5) Delete/Update/Replace Contact on Financial Account.
   a. If Delete Contact
      i. Compare privacy levels of the borrower to be deleted with the rest of the parties
      ii. Promote the most restrictive levels to the primary
      iii. Evaluate Privacy (see #2)
   b. If Update Contact
      i. Evaluate Privacy (see #2)
   c. If Replace Primary. No need to evaluate privacy.

For a discussion of the implementation details of an example of a event and workflow policy, please refer to Appendix B, which is attached hereto and is incorporated herein by reference, in their entirety and for all purposes.

An Example Computing and Network Environment

Figure 9:
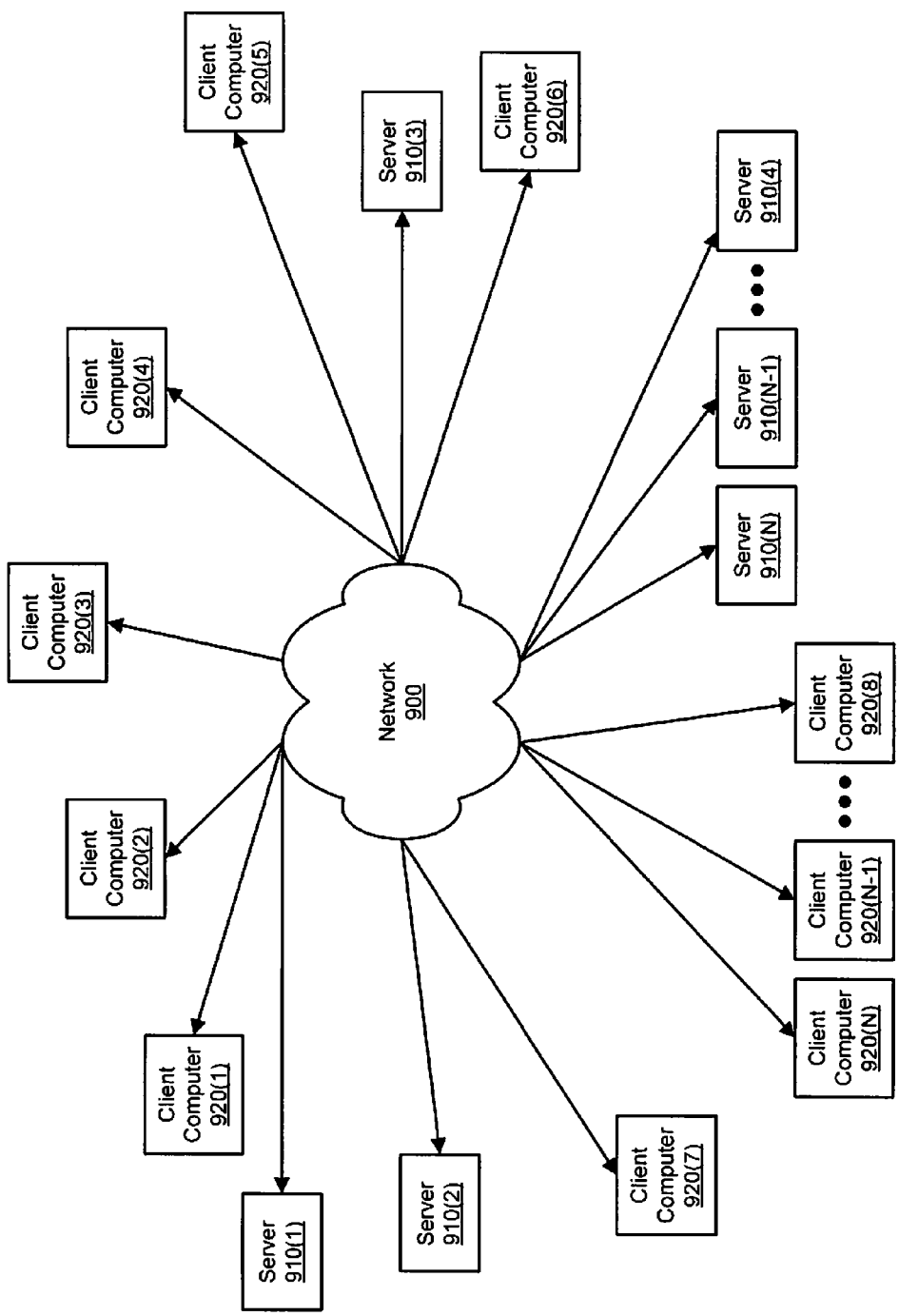
FIG. 9 is a block diagram illustrating a network environment in which a privacy management system according to embodiments of the present invention may be practiced.

FIG. 9 is a block diagram illustrating a network environment in which a system according to the present invention may be practiced. As is illustrated in FIG. 9, network 900, such as a private wide area network (WAN) or the Internet, includes a number of networked servers 910(1)-(N) that are accessible by client computers 920(1)-(N). Communication between client computers 920(1)-(N) and servers 910(1)-(N) typically occurs over a publicly accessible network, such as a public switched telephone network (PSTN), a DSL connection, a cable modem connection or large bandwidth trunks (e.g., communications channels providing T1 or OC3 service). Client computers 920(1)-(N) access servers 910(1)-(N) through, for example, a service provider. This might be, for example, an Internet Service Provider (ISP). Access is typically had by executing application specific software (e.g., network connection software and a browser) on the given one of client computers 920(1)-(N).

One or more of client computers 920(1)-(N) and/or one or more of servers 910(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 920(1)-(N) is shown in detail in FIG. 10.

Moreover, it will be noted that the variable identifier "N" is used in several instances in FIG. 3 to more simply designate the final element (e.g., search engine adapters 335(1)-(N) and search engines 345(1)-(N)) of a series of related or similar elements (e.g., search engine adapters and search engines). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 10:
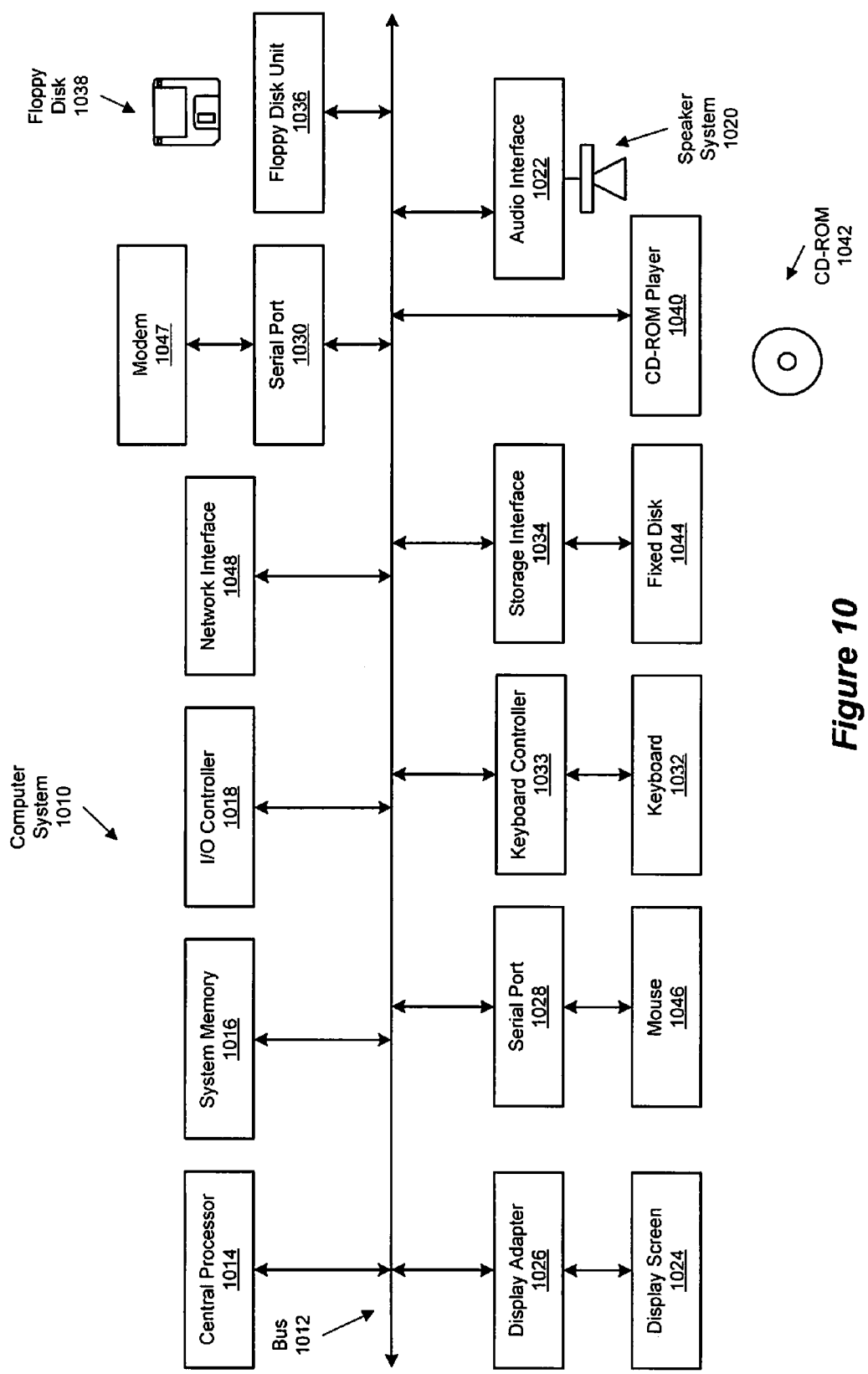
FIG. 10 is a block diagram illustrating a computer system suitable for implementing embodiments of the present invention.

FIG. 10 depicts a block diagram of a computer system 1010 suitable for implementing the present invention, and example of one or more of client computers 920(1)-(N). Computer system 1010 includes a bus 1012 which interconnects major subsystems of computer system 1010 such as a central processor 1014, a system memory 1016 (typically RAM, but which may also include ROM, flash RAM, or the like), an input/output controller 1018, an external audio device such as a speaker system 1020 via an audio output interface 1022, an external device such as a display screen 1024 via display adapter 1026, serial ports 1028 and 1030, a keyboard 1032 (interfaced with a keyboard controller 1033), a storage interface 1034, a floppy disk drive 1036 operative to receive a floppy disk 1038, and a CD-ROM drive 1040 operative to receive a CD-ROM 1042. Also included are a mouse 1046 (or other point-and-click device, coupled to bus 1012 via serial port 1028), a modem 1047 (coupled to bus 1012 via serial port 1030) and a network interface 1048 (coupled directly to bus 1012).

Bus 1012 allows data communication between central processor 1014 and system memory 1016, which may include both read only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components. Applications resident with computer system 1010 are generally stored on and accessed via a computer-readable storage medium, such as a hard disk drive (e.g., fixed disk 1044), an optical drive (e.g., CD-ROM drive 1040), floppy disk unit 1036 or other such storage medium.

Storage interface 1034, as with the other storage interfaces of computer system 1010, may connect to a standard computer-readable storage medium for storage and/or retrieval of information, such as a fixed disk drive 1044. Fixed disk drive 1044 may be a part of computer system 1010 or may be separate and accessed through other interface systems. Many other devices can be connected such as a mouse 1046 connected to bus 1012 via serial port 1028, a modem 1047 connected to bus 1012 via serial port 1030 and a network interface 1048 connected directly to bus 1012. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 10 to be present to practice the present invention. The devices and subsystems may be interconnected in different ways from that shown in FIG. 10. The operation of a computer system such as that shown in FIG. 10 is readily known in the art and is not discussed in detail in this application. Code to implement the present invention may be stored in computer-readable storage media such as one or more of system memory 1016, fixed disk 1044, CD-ROM 1042, or floppy disk 1038. Additionally, computer system 1010 may be any kind of computing device, and so includes personal data assistants (PDAs), network appliance, X-window terminal or other such computing device. The operating system provided on computer system 1010 may be MS-DOS®, MS-WINDOWS®, OS/2®, UNIX®, Linux® or other known operating system. Computer system 1010 also supports a number of Internet access tools, including, for example, an HTTP-compliant web browser having a JavaScript interpreter, such as Netscape Navigator®, Microsoft Explorer® and the like.

Figure 11:
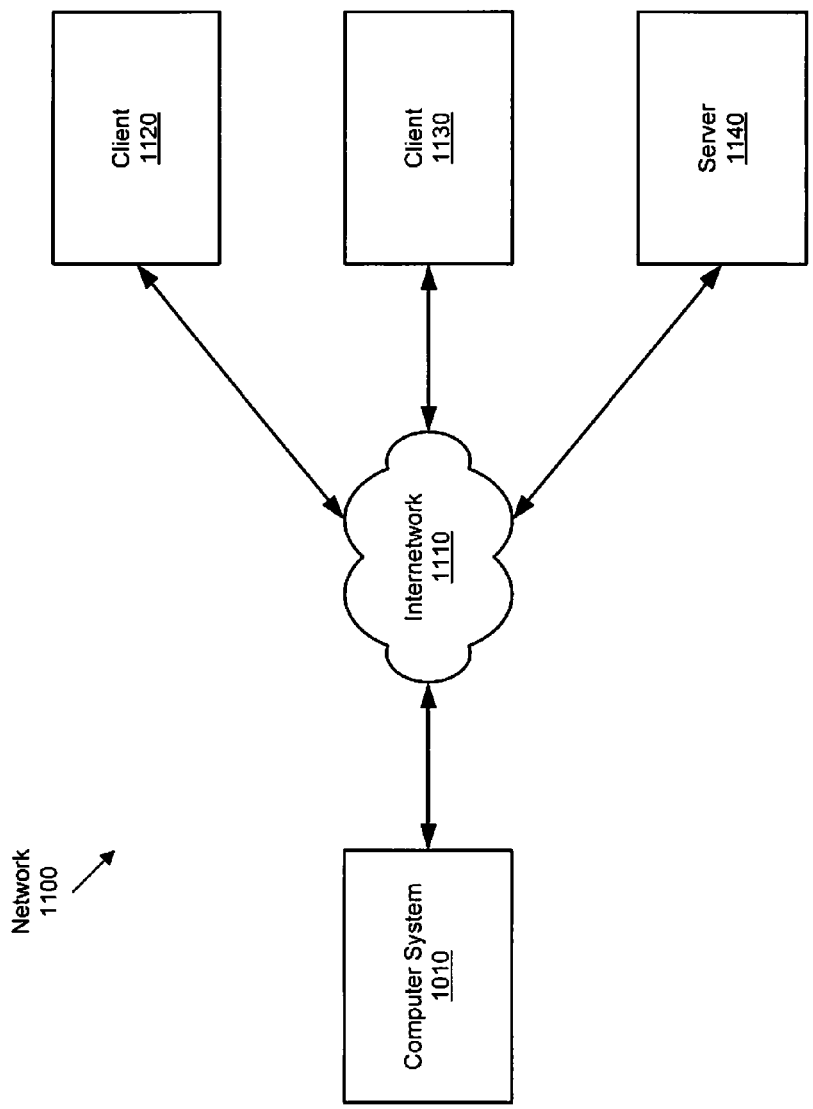
FIG. 11 is a block diagram illustrating the interconnection of the computer system of FIG. 10 to client and host systems.

FIG. 11 is a block diagram depicting a network 1100 in which computer system 1010 is coupled to an internetwork 1110, which is coupled, in turn, to client systems 1120 and 1130, as well as a server 1140. Internetwork 1110 (e.g., the Internet) is also capable of coupling client systems 1120 and 1130, and server 1140 to one another. With reference to computer system 1010, modem 1047, network interface 1048 or some other method can be used to provide connectivity from computer system 1010 to internetwork 1110. Computer system 1010, client system 1120 and client system 1130 are able to access information on server 1140 using, for example, a web browser (not shown). Such a web browser allows computer system 1010, as well as client systems 1120 and 1130, to access data on server 1140 representing the pages of a website hosted on server 1140. Protocols for exchanging data via the Internet are well known to those skilled in the art. Although FIG. 11 depicts the use of the Internet for exchanging data, the present invention is not limited to the Internet or any particular network-based environment.

Referring to FIGS. 9, 10 and 11, a browser running on computer system 1010 employs a TCP/IP connection to pass a request to server 1140, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of a computer system). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

What is claimed is:

1. A privacy management system comprising:
a privacy database, wherein
the privacy database comprises a privacy sharing preference of a customer,
the privacy sharing preference is configured to control sharing of personally identifiable information (PII) of the customer, and
the PII comprises
a first portion, and
a second portion;
a processor; and
a memory coupled to the processor, the memory storing instructions executable by the processor, the instructions configured to implement a privacy process module, wherein
the privacy process module is communicatively coupled to the privacy database,
the privacy process module is configured to
receive an insert record request from a source, wherein
the insert record request comprises privacy data of the customer, and
the source is an external computer system, and
determine whether a best version record associated with the customer exists in the privacy database, wherein
the best version record comprises a most current representation of the privacy sharing preference,
the privacy process module comprises a survivorship engine, wherein the survivorship engine is configured to
determine whether the source is trusted,
determine whether the privacy data can be used to update the best version record, in response to a determination that the source is trusted,
identify one or more fields of the privacy data that can be used to update one or more fields of the best version record, based on survivorship rules, and
update the one or more fields of the best version record to produce an updated best version record, and
the privacy process module is further configured to
store a revision history of the best version record, wherein
the revision history comprises at least a portion of the privacy data, the best version record, and the updated best version record,
determine whether the privacy data comprises at least one of opt-in information of the customer, wherein
the opt-in information indicates at least the first portion can be shared, or
opt-out information of the customer, wherein
the opt-out information indicates at least the second portion should not be shared,
define a default privacy sharing preference that indicates at least one of
the first portion is shared, or
the second portion is not shared, and
update the best version record with the default privacy sharing preference.

2. The privacy management system of claim 1, wherein the privacy process module is further configured to
determine whether the customer is a business customer or a consumer customer, in response to the determination that the source is trusted,
in response to a determination that the customer is a consumer customer, evaluate whether the privacy data comprises a new privacy sharing preference of the customer, and
update the best version record with the new privacy sharing preference, in response to an evaluation that the privacy data comprises the new privacy sharing preference.

3. The privacy management system of claim 2, wherein said privacy process module is further configured to:
in response to a determination that the customer is a business customer, evaluate whether the privacy data relates to a privacy sharing preference right, and
store the privacy data in the privacy database, in response to the evaluation.

4. The privacy management system of claim 1, further comprising
a privacy knowledgebase, wherein
the privacy knowledgebase comprises a plurality of privacy rules,
the plurality of privacy rules implement a privacy policy that comports with a plurality of laws and regulations,
the plurality of laws and regulations are applicable to an entity that stores the PII, and
the plurality of privacy rules are configured to further control how the PII of the customer is shared.

5. The privacy management system of claim 4, further comprising:
a privacy administration user interface (UI), wherein
said privacy administration UI is communicatively coupled to said privacy database.

6. The privacy management system of claim 4, further comprising:
a privacy rules user interface (UI), wherein
said privacy rules UI is communicatively coupled to said privacy knowledgebase, and
said privacy rules UI allows configuration of said privacy knowledgebase by virtue of being configured to
add a new privacy rule to said privacy rules,
modify an existing privacy rule from said privacy rules, and
delete said existing privacy rule from said privacy rules.

7. The privacy management system of claim 1, wherein the privacy process module is further configured to
set a privacy flag, wherein the privacy flag indicates a pending status,
set a privacy timer for a period of waiting time, and
upon expiration of the privacy timer, perform
the definition of the default privacy sharing preference, and
the updating of the best version record with the default privacy sharing preference.

8. The privacy management system of claim 1, wherein the survivorship engine is further configured to
determine a publication date of the privacy data, and
compare the publication date of the privacy data with a plurality of best version publication dates, wherein
the plurality of best version publication dates are associated with a plurality of fields of the best version record, and a comparison result identifies the one or more fields of the privacy data that can be used to update the one or more fields of the best version record.

9. The privacy management system of claim 1, wherein said privacy process module further comprises:
a batch management module configured to update a plurality of best version records in a batch;
a communications protocol layer configured to communicate with a plurality of external systems; and
an object manager configured to communicate with the privacy process module, wherein
the object manager is communicatively coupled to the batch management module, and the communications protocol layer.

10. The privacy management system of claim 1, said instructions are further configured to implement:
a user interface (UI) interaction module, wherein
said UI interaction module is communicatively coupled to said privacy process module, and
said UI interaction module comprises at least one of
a privacy status module configured to track current privacy sharing preferences of a plurality of customers, and
a privacy history module configured to track past privacy sharing preferences of the plurality of customers.

11. The privacy management system of claim 10, wherein said UI interaction module is configured to
detect a privacy event, wherein
the privacy event is caused by receipt of the privacy data of the customer, and
provide the privacy data to the privacy process module, in response to the detection of the privacy event.

12. The privacy management system of claim 1, wherein the privacy process module is further configured to
determine that no best version record associated with the customer exists in the privacy database, and
generate a new best version record associated with the customer, wherein
the best version record comprises the privacy data.

13. The privacy management system of claim 1, wherein the privacy process module is further configured to
evaluate whether the privacy data comprises a data update for the PII of the customer, wherein
the PII is stored in the privacy database, and
the PII comprises a plurality of best version data records, and
the survivorship module is further configured to
compare the privacy data with the plurality of best version data records of the customer, in response to an evaluation that the privacy data comprises the data update,
identify a matching best version data record that corresponds to the privacy data, and
update the matching best version data record with the privacy data, based on the survivorship rules.

14. The privacy management system of claim 13, wherein the privacy process module further comprises:
a source data history module configured to
in response to the data update, create a revision history by saving at least a portion of the matching best version data record as a historical record before the matching best version data record is updated with the data update.

15. A method comprising:
receiving, at a privacy management computer system, an insert record request from a source, wherein
the insert record request comprises privacy data of a customer, and
the source is an external computer system;
determining whether a best version record associated with the customer exists in a privacy database, wherein
the best version record comprises a most current representation of a privacy sharing preference of the customer,
the privacy sharing preference is configured to control sharing of personally identifiable information (PII) of the customer, and
the PII comprises
a first portion, and
a second portion;
determining whether the source is trusted;
determining whether the privacy data can be used to update the best version record, in response to a determination that the source is trusted;
identifying one or more fields of the privacy data that can be used to update one or more fields of the best version record, based on survivorship rules;
updating the one or more fields of the best version record to produce an updated best version record;
storing a revision history of the best version record, wherein
the revision history comprises at least a portion of the privacy data, the best version record, and the updated best version record;
determining whether the privacy data comprises at least one of
opt-in information of the customer, wherein
the opt-in information indicates at least the first portion can be shared, or
opt-out information of the customer, wherein
the opt-out information indicates at least the second portion should not be shared;
defining a default privacy sharing preference that indicates at least one of the first portion is shared, or
the second portion is not shared; and
updating the best version record with the default privacy sharing preference.

16. The method of claim 15, further comprising:
detecting a privacy event, wherein
said receiving of said privacy data of the customer causes said privacy event.

17. The method of claim 15, further comprising:
in response to a determination that the customer is a business customer,
evaluating whether the privacy data relates to a privacy preference right, and
storing the privacy data in said privacy database, in response to said evaluation.

18. The method of claim 15, further comprising:
evaluating whether the privacy data comprises a data update for the PII of the customer, wherein
the PII is stored in the privacy database, and
the PII comprises a plurality of best version data records;
comparing the privacy data with the plurality of best version data records of the customer, in response to an evaluation that the privacy data comprises the data update;
identifying a matching best version data record that corresponds to the privacy data; and
updating the matching best version data record with the privacy data, based on the survivorship rules.

19. The method of claim 18, further comprising:
in response to the data update, creating a revision history by saving at least a portion of the matching best version data record as a historical record before the matching best version data record is updated with the data update.

20. The method of claim 15, wherein
the privacy management computer system comprises a privacy knowledgebase,
the privacy knowledgebase comprises
a plurality of privacy rules, and
a privacy vocabulary,
the plurality of privacy rules implement a privacy policy that comports with a plurality of laws and regulations,
the plurality of laws and regulations are applicable to an entity that stores the PII,
the plurality of privacy rules are configured to further control sharing of the PII of the customer,
the privacy vocabulary comprises a plurality of rule building blocks, and
the plurality of privacy rules are built using the plurality of rule building blocks.

21. The method of claim 20, further comprising at least one of:
adding a new privacy rule to the plurality of privacy rules,
modifying an existing privacy rule from the plurality of privacy rules, and
deleting existing privacy rule from the plurality of privacy rules.

22. A non-transitory computer program product comprising non-transitory computer readable storage media comprising a plurality of instructions executable on a computer system, wherein the plurality of instructions are configured to:
receive an insert record request from a source, wherein
the insert record request comprises privacy data of a customer, and
the source is an external computer system;
determine whether a best version record associated with the customer exists in a privacy database, wherein
the best version record comprises a most current representation of a privacy sharing preference of the customer,
the privacy sharing preference is configured to control sharing of personally identifiable information (PII) of the customer, and
the PII comprises
a first portion, and
a second portion;
determine whether the source is trusted;
determine whether the privacy data can be used to update the best version record, in response to a determination that the source is trusted;
identify one or more fields of the privacy data that can be used to update one or more fields of the best version record, based on survivorship rules;
update the one or more fields of the best version record to produce an updated best version record;
store a revision history of the best version record, wherein
the revision history comprises at least a portion of the privacy data, the best version record, and the updated best version record;
determine whether the privacy data comprises at least one of
opt-in information of the customer, wherein
the opt-in information indicates at least the first portion can be shared, or
opt-out information of the customer, wherein
the opt-out information indicates at least the second portion should not be shared;
define a default privacy sharing preference that indicates at least one of
the first portion is shared, or
the second portion is not shared; and
update the best version record with the default privacy sharing preference.

23. The non-transitory computer program product of claim 22, wherein said instructions are further configured to:
detect a privacy event, wherein
receipt of the privacy data of the customer causes the privacy event.

24. The non-transitory computer program product of claim 23, wherein said instructions are further configured to:
in response to a determination that the customer is a business customer, evaluate whether the privacy data relates to a privacy preference right, and
store the privacy data in said privacy database, in response to said evaluation.

25. The non-transitory computer program product of claim 23, wherein said instructions are further configured to:
evaluate whether the privacy data comprises a data update for the PII of the customer, wherein
the PII is stored in the privacy database, and
the PII comprises a plurality of best version data records;
compare the privacy data with the plurality of best version data records of the customer, in response to an evaluation that the privacy data comprises the data update;
identify a matching best version data record that corresponds to the privacy data; and
update the matching best version data record with the privacy data, based on the survivorship rules.

26. The non-transitory computer program product of claim 25, wherein said instructions are further configured to:
in response to the data update, create a revision history by saving at least a portion of the matching best version data record as a historical record before the matching best version data record is updated with the data update.

* * * * *

UNITED STATES PATENT AND TRADEMARK OFFICE
CERTIFICATE OF CORRECTION

PATENT NO.        : 8,606,746 B2                                          Page 1 of 1
APPLICATION NO.   : 12/254691
DATED             : December 10, 2013
INVENTOR(S)       : Yeap et al.

It is certified that error appears in the above-identified patent and that said Letters Patent is hereby corrected as shown below:

In the Specification

In column 20, line 2, delete "(ORG GRP):" and insert -- (ORG_GRP): --, therefor.

In column 33, line 20, delete "fccount" and insert -- Account --, therefor.

In column 39, line 61, before "is" delete "modeling".

In column 41, line 56, delete "Annual Notice" and insert -- Annual_Notice --, therefor.

Signed and Sealed this
Eighth Day of July, 2014

Michelle K. Lee
*Deputy Director of the United States Patent and Trademark Office*